United States Patent
Saleh et al.

(10) Patent No.: US 7,477,594 B2
(45) Date of Patent: *Jan. 13, 2009

(54) METHOD FOR RESTORING A VIRTUAL PATH IN AN OPTICAL NETWORK USING 1:N PROTECTION

(75) Inventors: Ali Najib Saleh, Ft. Lauderdale, FL (US); H. Michael Zadikian, McKinney, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 1500 days.

This patent is subject to a terminal disclaimer.

(21) Appl. No.: 09/876,380

(22) Filed: Jun. 7, 2001

(65) Prior Publication Data

US 2005/0036442 A1    Feb. 17, 2005

Related U.S. Application Data

(63) Continuation-in-part of application No. 09/858,743, filed on May 16, 2001.

(51) Int. Cl.
    *G01R 31/08* (2006.01)
(52) U.S. Cl. ...................................... 370/225
(58) Field of Classification Search .......... None
    See application file for complete search history.

(56) References Cited

U.S. PATENT DOCUMENTS

| 5,049,871 A | 9/1991 | Sturgis et al. ............... 370/224 |
| 5,065,399 A | 11/1991 | Hasegawa et al. ............. 714/4 |
| 5,093,824 A | 3/1992 | Coan et al. ................... 370/16 |
| 5,412,376 A | 5/1995 | Chujo et al. ............. 340/825.1 |
| 5,590,118 A | 12/1996 | Nederlof .................... 370/218 |
| 5,596,722 A | 1/1997 | Rahnema .................... 395/200 |
| 5,646,936 A * | 7/1997 | Shah et al. .................. 370/228 |
| 5,687,167 A | 11/1997 | Bertin et al. ................ 370/254 |

(Continued)

FOREIGN PATENT DOCUMENTS

EP    0 781 068 A1    6/1997

(Continued)

OTHER PUBLICATIONS

Hideki Sakauchi, et al., "A Self-Healing Network With An Economical Spare-Channel Assignment", Proceedings of the Globecom '90 IEEE Telecommunications Conference & Exhibition, vol. 1, 1991, pp. 438-443.

(Continued)

*Primary Examiner*—Firmin Backer
*Assistant Examiner*—Phuongchau B Nguyen
(74) *Attorney, Agent, or Firm*—Campbell Stephenson LLP

(57) ABSTRACT

A method for restoring a virtual path, provisioned between a source and a target node, in a zoned mesh optical network is described. The method, in one embodiment, allocates a primary and a secondary physical path to the virtual path. The two physical paths are node and link disjoint. In case of a failure on one physical path, the network switches the virtual path to the other physical path. The alternate path can be shared among various virtual paths during the restoration.

108 Claims, 12 Drawing Sheets

U.S. PATENT DOCUMENTS

| | | | | |
|---|---|---|---|---|
| 5,737,319 | A | 4/1998 | Croslin et al. | 370/255 |
| 5,748,611 | A | 5/1998 | Allen et al. | 370/221 |
| 5,781,528 | A | 7/1998 | Sato et al. | 370/218 |
| 5,805,578 | A | 9/1998 | Stirpe et al. | 370/255 |
| 5,805,593 | A | 9/1998 | Busche | 370/396 |
| 5,835,696 | A | 11/1998 | Hess | 395/182.08 |
| 5,838,924 | A * | 11/1998 | Anderson et al. | 370/225 |
| 5,881,048 | A | 3/1999 | Croslin | 370/228 |
| 5,881,246 | A | 3/1999 | Crawley et al. | 709/238 |
| 5,884,297 | A | 3/1999 | Noven | 707/1 |
| 5,920,257 | A | 7/1999 | Commerford | 340/506 |
| 5,933,425 | A | 8/1999 | Iwata | 370/351 |
| 5,959,972 | A | 9/1999 | Hamami | 370/228 |
| 5,987,526 | A | 11/1999 | Morales | 709/249 |
| 5,995,503 | A | 11/1999 | Crawley et al. | 370/351 |
| 5,999,286 | A | 12/1999 | Venkatesan | 359/117 |
| 6,011,780 | A * | 1/2000 | Vaman et al. | 370/237 |
| 6,041,037 | A | 3/2000 | Nishio et al. | 370/228 |
| 6,041,049 | A | 3/2000 | Brady | 370/351 |
| 6,047,331 | A | 4/2000 | Medard et al. | 709/239 |
| 6,075,766 | A | 6/2000 | Croslin | 370/225 |
| 6,075,775 | A | 6/2000 | Ueki | 370/248 |
| 6,097,696 | A | 8/2000 | Doverspike | 370/216 |
| 6,097,722 | A | 8/2000 | Graham et al. | 370/395 |
| 6,115,753 | A | 9/2000 | Joens | 709/242 |
| 6,130,876 | A | 10/2000 | Chaudhuri | 370/228 |
| 6,130,881 | A | 10/2000 | Stiller et al. | 370/238 |
| 6,134,671 | A | 10/2000 | Commerford et al. | 714/4 |
| 6,148,000 | A | 11/2000 | Feldman et al. | 370/397 |
| 6,154,778 | A | 11/2000 | Koistinen et al. | 709/228 |
| 6,163,525 | A | 12/2000 | Bentall et al. | 370/227 |
| 6,167,025 | A | 12/2000 | Hsing et al. | 370/216 |
| 6,222,653 | B1 | 4/2001 | Asahi | 359/110 |
| 6,259,673 | B1 | 7/2001 | Yoshihara et al. | 370/238 |
| 6,272,107 | B1 | 8/2001 | Rochberger et al. | 370/216 |
| 6,275,492 | B1 | 8/2001 | Zhang | 370/392 |
| 6,282,170 | B1 | 8/2001 | Bentall et al. | 370/225 |
| 6,292,464 | B1 | 9/2001 | Elahmadi et al. | 370/223 |
| 6,301,244 | B1 | 10/2001 | Huang et al. | 370/351 |
| 6,304,549 | B1 | 10/2001 | Srinivasan et al. | 370/230 |
| 6,324,162 | B1 | 11/2001 | Chaudhuri | 370/225 |
| 6,347,078 | B1 | 2/2002 | Narvaez-Guarnieri et al. | 370/230 |
| 6,370,119 | B1 | 4/2002 | Basso et al. | 370/252 |
| 6,400,681 | B1 | 6/2002 | Bertin et al. | 370/218 |
| 6,407,834 | B1 * | 6/2002 | Takeshita et al. | 398/175 |
| 6,430,150 | B1 | 8/2002 | Azuma et al. | 370/218 |
| 6,442,131 | B1 * | 8/2002 | Kondo | 370/218 |
| 6,457,050 | B1 | 9/2002 | Cowan et al. | 709/224 |
| 6,463,062 | B1 | 10/2002 | Buyukkoc et al. | 370/395.1 |
| 6,504,845 | B1 | 1/2003 | Petersen et al. | 370/412 |
| 6,952,395 | B1 * | 10/2005 | Manoharan et al. | 370/223 |
| 6,990,068 | B1 * | 1/2006 | Saleh et al. | 370/225 |
| 7,043,250 | B1 * | 5/2006 | DeMartino | 370/216 |
| 2002/0172148 | A1 * | 11/2002 | Kim et al. | 370/216 |
| 2002/0186654 | A1 * | 12/2002 | Tornar | 370/225 |
| 2002/0191247 | A1 * | 12/2002 | Lu et al. | 359/124 |
| 2003/0179700 | A1 * | 9/2003 | Saleh et al. | 370/216 |
| 2006/0153066 | A1 * | 7/2006 | Saleh et al. | 370/216 |

FOREIGN PATENT DOCUMENTS

EP    0 841 824 A2    5/1998

OTHER PUBLICATIONS

Baruch Awerbuch, et al., "Distrubuted Controls For Paris", Proc. Annual ACM Symp. On Principles Of Distributed Computing, Aug. 22, 1999, pp. 145-159.

Sujai Hajela, "HP OEMF: Alarm Management In Telecommunications Networks", *Hewlett Packard Journal*, Oct. 1996, vol. 47, No. 5, pp. 22-30.

Ali Saleh, H. Michael Zadikian, Zareh Baghdasarian, Vahid Parsi, "A Method For Routing Information Over A Network", filed Jan. 15, 1999, U.S. Appl. No. 09/232,397.

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Inter-switch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997.pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Switch-Switch Protocol", NTT Laboratories, Jun. 1997.

F. Baker, et al., "OSPF Version 2 Management Information Base", Cisco Systems, Nov. 1995.

F. Baker, et al., "PPP Bridging Control Protocol (BCP)", IBM, Jun. 1994.

E. Decker, "Definitions of Managed Objects for Bridges", Cisco Systems, Inc., Jul. 1993.

* cited by examiner

METHOD FOR RESTORING A VIRTUAL PATH IN AN OPTICAL NETWORK USING 1:N PROTECTION

CROSS-REFERENCES TO RELATED APPLICATIONS

This application is a continuation-in-part of U.S. patent application Ser. No. 09/858,743, filed May 16, 2001 and entitled "A Resource Reservation Scheme For Path Restoration In An Optical Network," having A. N. Saleh, H. M. Zadikian, Z. Baghdasarian, and V. Parsi as inventors. This application is assigned to Cisco Technology, Inc the assignee of the present invention, and is hereby incorporated by reference, in its entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment of the present invention a method and apparatus for restoring a virtual path in an optical network is described. The method includes identifying multiple nodes with resources, provisioning a first physical path for the virtual path, reserving a resource for a second physical path for the virtual path at ones of the nodes having the resource necessary to support the virtual path and restoring the virtual path by provisioning the second physical path on the reserved resource.

In another embodiment, the method detects a failure in the virtual path by receiving a failure message packet.

In another embodiment, the resources of the second physical path are shared by a multiple of other virtual paths.

In another embodiment, one of the physical paths that is not used by the virtual path, is used by a protection channel access traffic The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

A network can employ various restoration schemes to restore a virtual path (VP) in case of a failure. To guarantee the restoration of a VP in case of a failure, each VP is assigned a restoration priority level. The restoration priority level determines the VP's relative priority with regard to restoration in the event of a failure within the network. The present invention provides a method of restoring virtual paths of high-priority data. VPs carrying high-priority mission-critical application, where virtually no disruption of traffic can be tolerated, are restored using a restoration scheme that provides two distinct physical paths. Each path is preferably link-and-node disjoint. Only one of these paths is active at any time, while the other is in standby mode. A failure along the active path will cause traffic to be switched over to the standby path. The paths are provisioned by two independent provisioning commands.

Network Configuration

Figure 1:
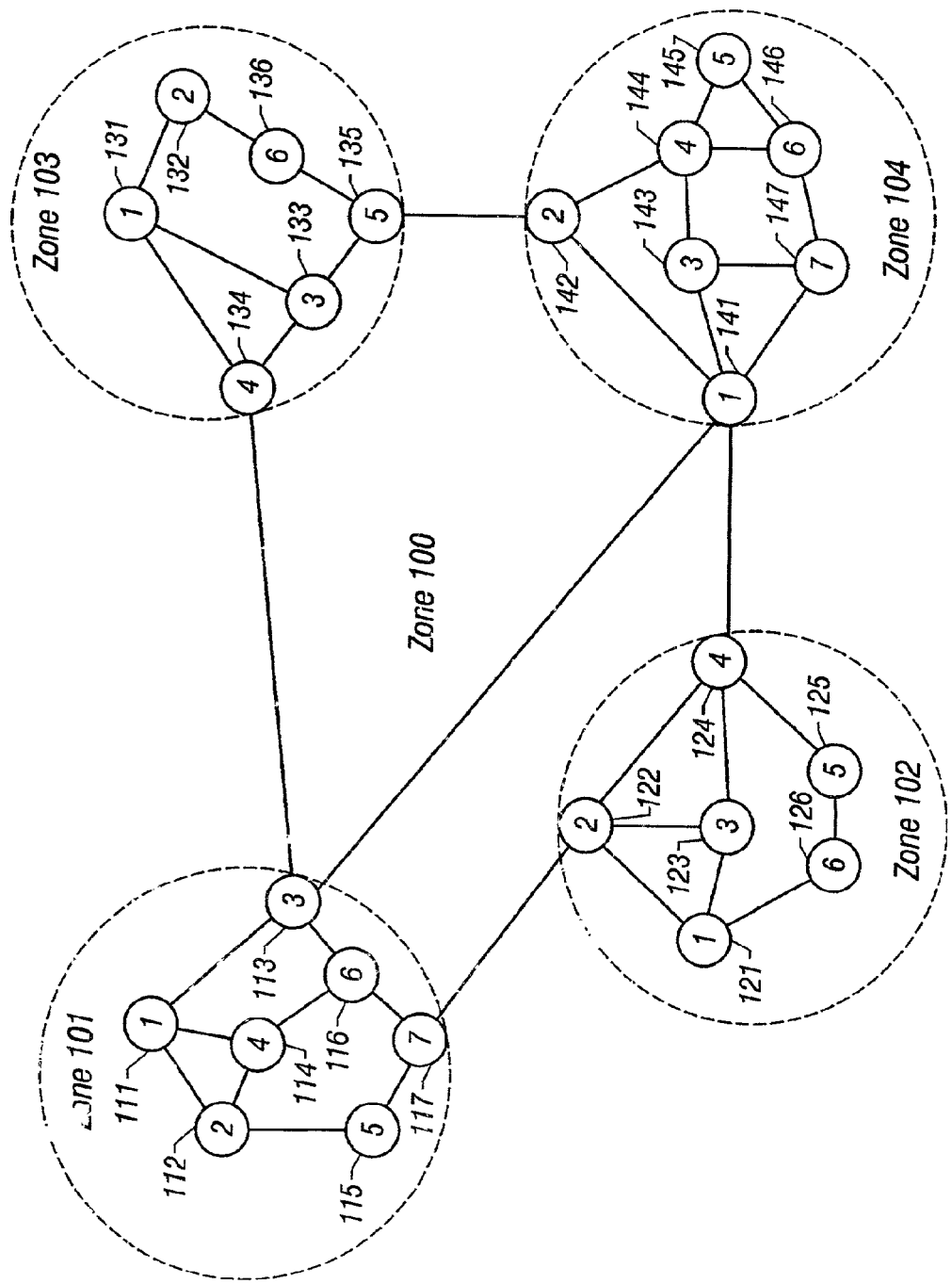
FIG. 1 is a block diagram of a zoned network.

FIG. 1 illustrates an exemplary zoned mesh network. The network can be configured in a non-zoned network in which network nodes are coupled in a mesh topology. The exemplary zoned mesh network of FIG. 1 has been organized into a backbone, zone 100, and four configured zones, zones 101-104. The solid circles in each zone represent network nodes, while the numbers within the circles represent node addresses, and include network nodes 111-117, 121-126, 131-136, and 141-147. The dashed circles represent network zones. The network depicted in FIG. 1 has four configured zones (zones 101-104 (addressed as zone 1-4) and one backbone (zone 100). Network nodes 113, 117, 122, 124, 134, 135, 141, and 142, are boundary or proxy nodes because they connect to more than one zone. All other nodes are interior nodes because their links attach only to nodes within the same zone. However, the exemplary network of FIG. 1 can be configured as non-zoned mesh network. In a non-zoned mesh network, nodes are combined into one network with no boundary or proxy node.

Provisioning of Network Nodes

Once a mesh network topology has been defined (e.g., the zoned topology of FIG. 1), the user can configure one or more end-to-end connections that can span multiple nodes or zones, an operation is referred to herein as provisioning. For each virtual path to be provisioned, a physical path must be selected and configured. Each set of physical connections that are provisioned creates an end-to-end connection between the two end nodes that supports a virtual point-to-point link (referred to herein as a virtual path or VP). The resulting VP has an associated capacity and an operational state, among other attributes.

In a network, VPs may be provisioned statically or dynamically. For example, a user can identify the nodes that will comprise the virtual path and manually configure each node to support the given virtual path. The selection of nodes may be based on any number of criteria, such as Quality of Service (QoS), latency, cost, distance traveled in the network and the like. Alternatively, the VP may be provisioned dynamically using any one of a number of methods. The provisioning information may then be forwarded to all the nodes in the network to store information in node's network topology database. Each node periodically updates this information to efficiently maintain resources and in case of path failure, effectively allocate appropriate resources needed for specific virtual path for path restoration. The method of routing information in such networks is described in a commonly-assigned U.S. patent application Ser. No. 09/232,395, entitled "A Configurable Network Router," filed Jan. 15, 1999, which is hereby incorporated by reference, in its entirety and for all purposes.

The end nodes of a VP can be configured to have a master/slave relationship. The terms source and destination are also used herein in referring to the two end-nodes. In such a relationship, the node with a numerically lower node ID typically assumes the role of the master (or source) node, while the other assumes the role of the slave (or destination) node, although the opposite arrangement is also acceptable. An intermediate node is referred to herein as tandem node. Typically, the source node assumes the provisioning responsibilities and the destination node simply waits for a message from the source node informing the destination node of the VP's new physical path (although again, this need not necessary be the case). This information includes node identifiers of tandem nodes, if any, within the path. In a zoned mesh topology, if a virtual path spans over multiple zones, the border node or proxy node of each zone acts as source node for their particular zone. As will be apparent to one of skill in the art, the opposite convention or another paradigm can easily be employed.

Typically, during provisioning, each VP is assigned a performance and restoration priority level. The priority, referred to herein as Class of Service (CoS), determines VP's relative priority for performance within the network and restoration in the event of a failure within the network. The method of assigning CoS to a VP is described in commonly-assigned U.S. patent application Ser. No. 09/858,743, filed on May 16, 2001, entitled "A Resource Reservation Scheme for Path Restoration in an Optical Network," which is hereby incorporated by reference, in its entirety and for all purposes. In case of a VP failure at a node in the network, the node determines how to restore the VP based on the CoS assigned to the VP. The assigned CoS defines the restoration method used by the node to restore failed VP.

Provisioning of Virtual Path using 1:N Protection

The 1:N restoration method is typically assigned to mission critical data paths with higher CoS. Typically, the source node of a VP initiates the provisioning using Add Path Request packet. Additional information regarding the initiation of Add Path request and the allocation of physical resources for a VP may be found in commonly-assigned U.S. patent application Ser. No. 09/891,022, filed Jun.25, 2001 and entitled "A Method for Restoring a Virtual Path in an Optical Network Using Dynamic Unicast."

In 1:N restoration method, two or more distinct physical paths are provisioned and assigned to a VP. Each provisioned physical path is node and link disjoint. The VP is provisioned by using two separate Add Path requests for two distinct physical paths. The provisioning of the VP is not considered successful unless two distinct physical paths are provisioned and assigned to the VP. One of the two assigned physical paths is designated as the primary path and the other physical path is designated as the secondary path. During the provisioning, each intermediary node allocates specific ports (resources) at input and output links for the primary path. However, for the secondary path, each node reserves link bandwidth and specific ports on the input/output links are not assigned. The ports for the secondary paths are assigned during the restoration process.

1:N restoration method allows the spare bandwidth capacity of one or more links of the secondary path to be shared by a group of 'N' VPs for restoration purpose. The VPs sharing the link bandwidth may not originate and terminate at the same node. A user can identify the threshold number 'N', at the time of provisioning to define the maximum number of VPs that can share the secondary path. The network can also dynamically adjust the actual number of VPs that may use the secondary path based on the network traffic condition and available bandwidth capacity at each link.

Figure 2:
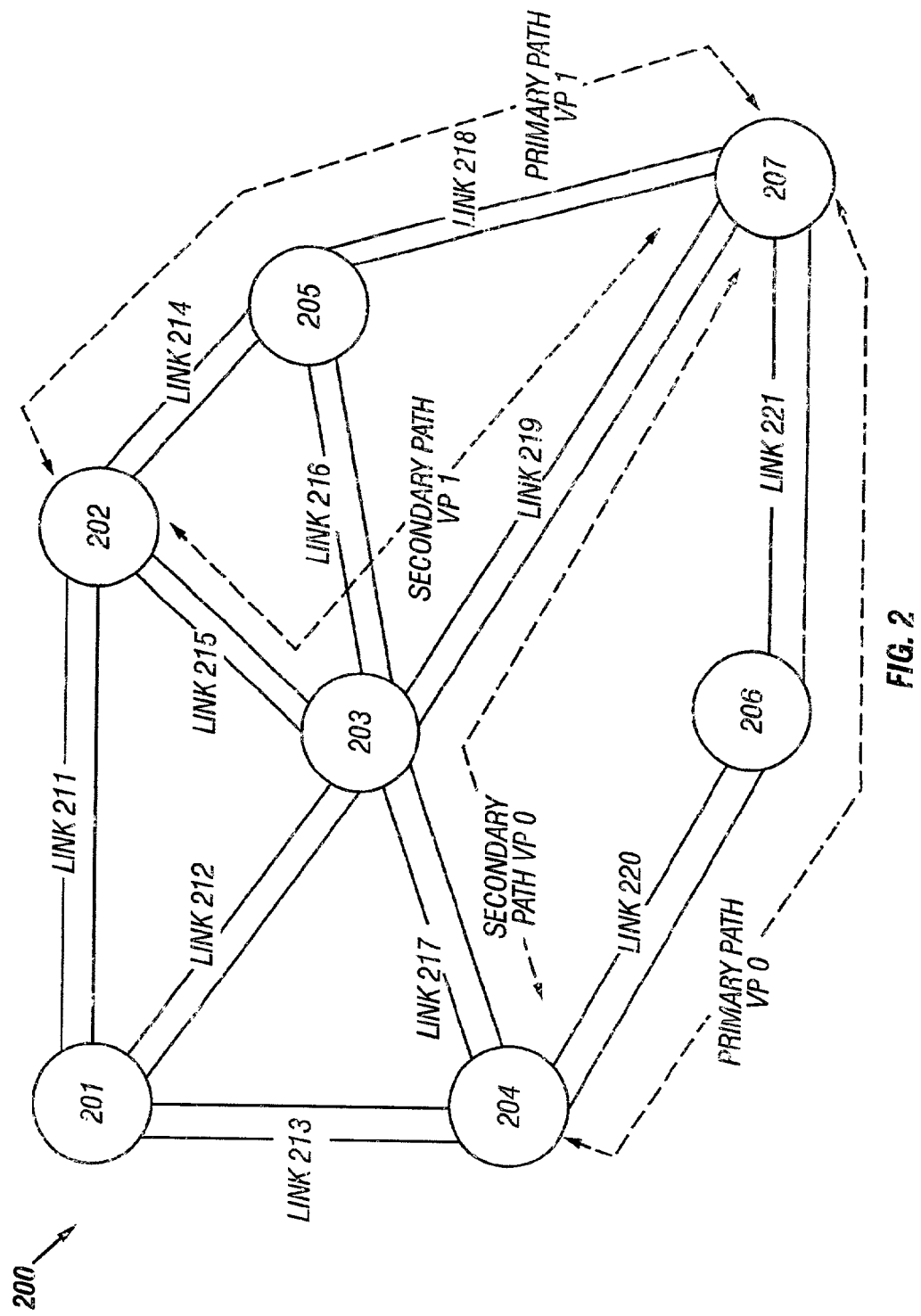
FIG. 2 illustrates an example of provisioning a virtual path using 1:N restoration method.

FIG. 2 illustrates an example of VP provisioning using 1:N restoration method. The network 200 includes seven nodes, nodes 201-207 and eleven optical links, links 211-221. Each node is connected to an adjacent node by an optical link thus creating a physical path between the two nodes. Two virtual paths, VP 0 and VP 1 are provisioned in the network 200. The primary path of VP 0 is provisioned over nodes 204, 206 and 207 using the physical paths of links 220 and 221. VP 0 originates at node 204 (the source node) and terminates at node 207 (the destination node). The primary path of VP 1 is provisioned over nodes 202, 205 and 207 using the physical paths of links 214 and 218. VP 1 originates at node 202 (the source node) and terminates at node 207 (the destination node). The secondary path of VP 0 is provisioned over nodes 204, 203 and 207 using the physical paths of links 217 and 219. The secondary path of VP 1 is provisioned over nodes 202, 203 and 207 using the physical paths of links 215 and 219.

The secondary paths of VP 0 and VP 1 share the physical path at link 219. Both VPs share the physical path bandwidth of link 219. For link 219, the value of threshold 'N' is 2. Similarly, various virtual paths can be provisioned to share the physical path bandwidths of multiple links throughout the network. The numbers of VPs sharing a particular physical path depend upon factors such as link capacity, available bandwidth, requirements regarding reliability of transmission over a particular link and the like.

Provisioning of Virtual Path using 1:1 Protection

The 1:1 restoration method is typically assigned to mission-critical data paths with higher CoS and requiring higher reliability during the restoration. Typically, the source node of a VP initiates the provisioning using an Add Path Request packet. The secondary path of a VP can be provisioned to allow the VP to use the entire secondary path during the restoration.

Figure 3:
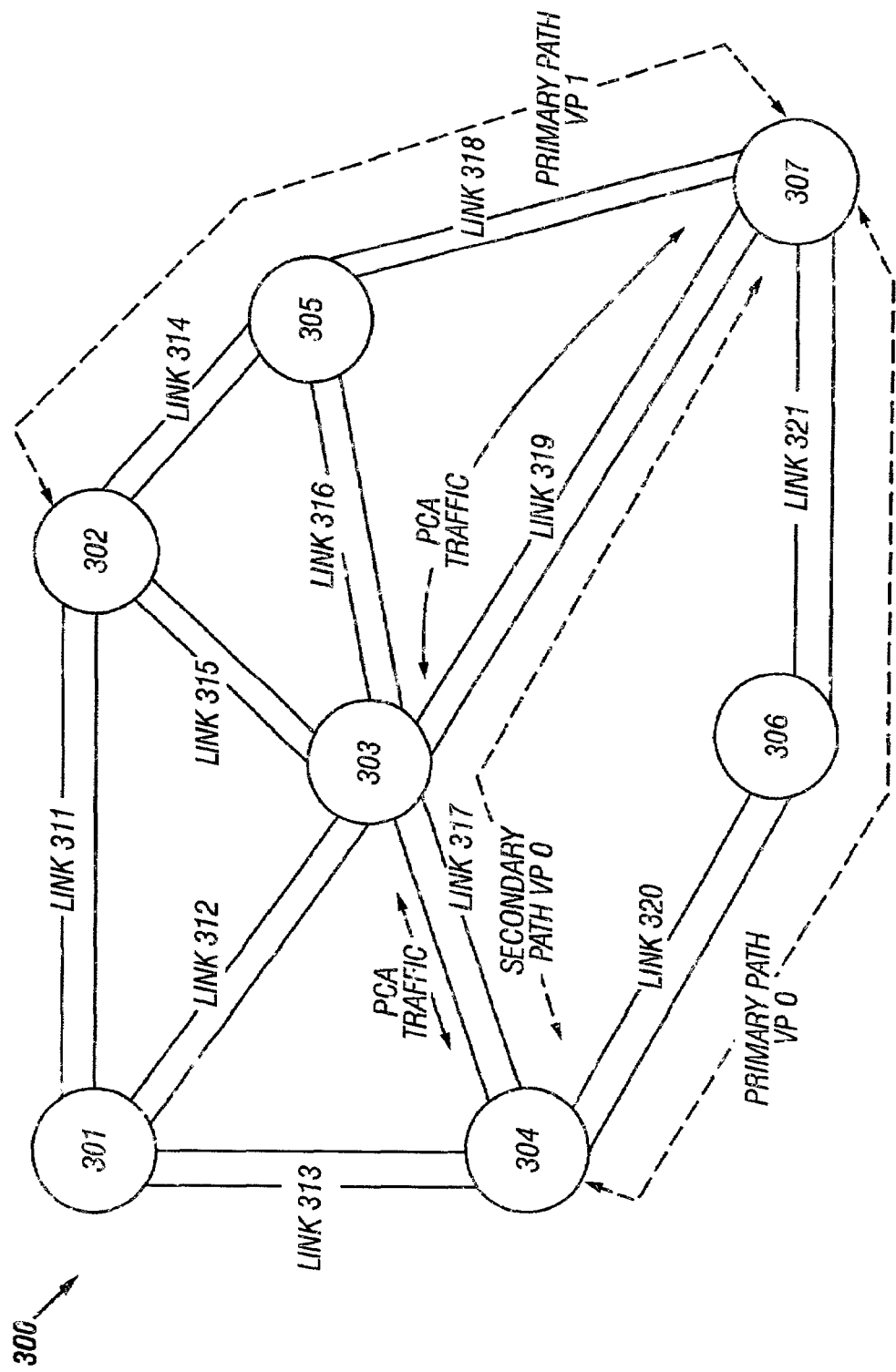
FIG. 3 illustrates an example of provisioning a virtual path using 1:1 restoration method.

FIG. 3 illustrates an example of provisioning of a VP using 1:1 restoration method. In a network 300, the physical path at a link 319 is allocated to one VP for 1:1 restoration. For example, if VP 0 is provisioned first, then the physical path at link 319 is reserved for the secondary path of VP 0. After the provisioning of VP 0, other VPs do not use the reserved physical path at link 319. The secondary path including the physical paths at link a 317 and link 319 is dedicated to VP 0 for restoration. However, when VP0 is not using the secondary path, the network allows the low priority protection channel access (PCA) traffic to use the physical paths of the secondary path. As long as VP 0 is using the primary path, the physical paths at link 317 and link 319 can be used by the PCA traffic. In case when VP 0 fails on the primary path, the network tears down the PCA traffic on the physical paths at link 317 and link 319 and allocates the physical paths at these links to VP 0 for restoration. The method of routing protection channel access traffic in a mesh topology is described in a commonly-assigned U.S. patent application Ser. No. 09/676,743, filed Sep. 29, 2000 and entitled "Mesh With Protection Channel Access (MPCA)," which is hereby incorporated by reference, in its entirety and for all purposes.

Failure Detection, Propagation, and Restoration

Failure Detection and Propagation

In networks, failures are typically detected using the mechanisms provided by the underlying physical network. The failure detection mechanism in a mesh optical network is described in commonly-assigned U.S. patent application Ser. No. 09/232,397, filed Jan. 15, 1999 and entitled "A Method For Routing Information Over A Network," which is hereby incorporated by reference, in its entirety and for all purposes.

1:N Restoration

Preferably, the source node of a VP initiates the 1:N restoration. When a node other than the source node detects a path failure in the VP, the node initiates a path restoration request for the source node of the failed VP using a Restore I request. The method of generating Restore I requests and associated responses is described in commonly-assigned U.S. patent application Ser. No. 09/750,668, filed on Dec. 29, 2000 and entitled "A Virtual Path Restoration Scheme Using Fast Dynamic Mesh Restoration in an Optical Network," which is hereby incorporated by reference, in its entirety and for all purposes.

For a VP with 1:N restoration method, the bandwidth is reserved at intermediary nodes of the secondary path during provisioning. However, the specific ports for the secondary path are not allocated until the primary path fails and the ports are needed for the secondary path. In case of a path failure on VP's primary path, the source node of the failed VP initiates a Switch Path request for the intermediary nodes of the secondary path to allocate specific ports.

Figure 4:
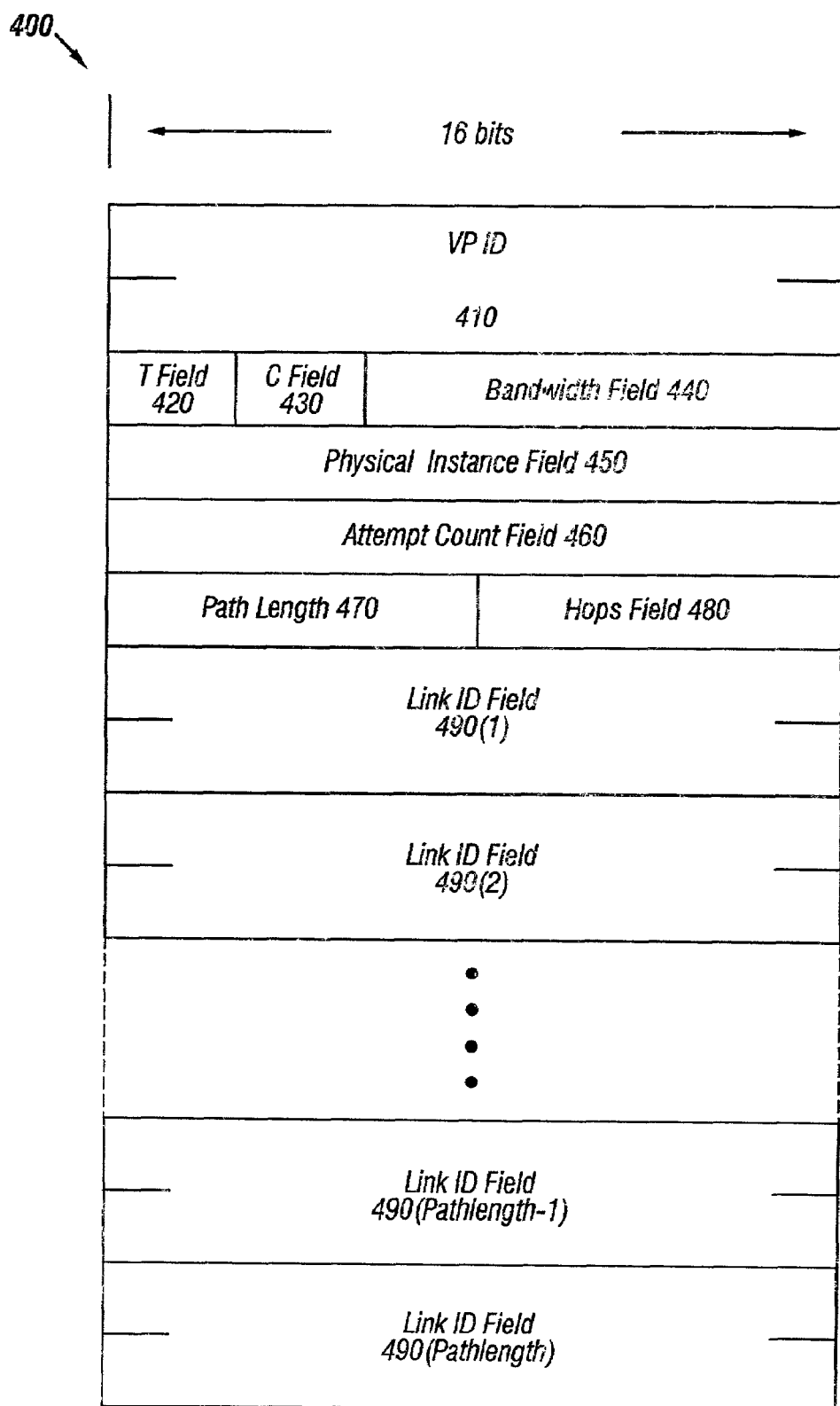
FIG. 4 illustrates an example of a Switch Path request packet.

FIG. 4 illustrates an example of the Switch Path request packet 400. The packet includes a VP-ID 410, (e.g., the VP's 32 bit ID). It will be apparent to one of skill in the art that, while specific lengths are described, the various fields discussed herein may be of any appropriate length. A 2-bit long 'T' field 420 is used to indicate the type of path. This field indicates whether the path is the primary path or the secondary path of the VP. A 2-bit long 'C' field 430 defines the restoration Class of Service. A 12-bit long bandwidth field 440 indicates the bandwidth requested for the VP (for example, in STS-48 granularity).

A physical instance field 450 stores a 16-bit physical instance identifier for the VP. The source node of the VP maintains physical instance field 450, which is associated with the path (i.e., set of Link IDs) of the VP and is part of Switch Path request 400 and all restoration-related packets. Preferably, only the source node should be allowed to update this field.

An attempt count field 460 is a count of the attempt for the current physical instance of the VP. This field is incremented every time the source resends the same request. Since Switch Path request packets are retransmitted periodically, different attempts are preferably distinguished from one another. Attempt count field 460 allows retransmitted requests to be distinguished from one another. Attempt count field 460 starts at a given point (e.g., from 1) and is incremented (e.g., by 1) with each retransmission. Attempt count field 460 allows the intermediate node to differentiate among multiple request attempts for restoration of the same physical instance of the same VP.

A path length field 470 indicates the number of links in the VP. Path length field 470 determines the number of link identifications that appear at the end of the packet. Hops field 480 indicates the number of hops traversed by the given Switch Path request packet. Hops field 480 is incremented (e.g., by 1) at each receiving node in the given Switch Path request. During the transmission of a Switch Path request, the value of path length field 470 is incremented (e.g., from 0 to (Path Length−1)).

Upon the return of a response, hops field 480 is decremented (e.g., by 1) by each node that forwards the response to the source node. During the transmission of a response, the value of hops field 480 is decremented from the maximum number of hops traversed to zero by the time the response reaches the source node (e.g., from (Path Length−1) to 0). A link ID field 490 is a 32-bit long field for the Link IDs of the VP. The number of Link IDs depends upon the path length set by the source node.

Upon sending Switch Path request 400, the source node sets a timer. If a positive response is not received before the timer expires, the source node generates another Switch Path request. Attempt count field 460 in the Switch Path request is incremented (e.g., by 1) each time the request is generated. The Switch Path requests are preferably generated for only a certain number of times, after which the source node generates a network alarm.

Figure 5:
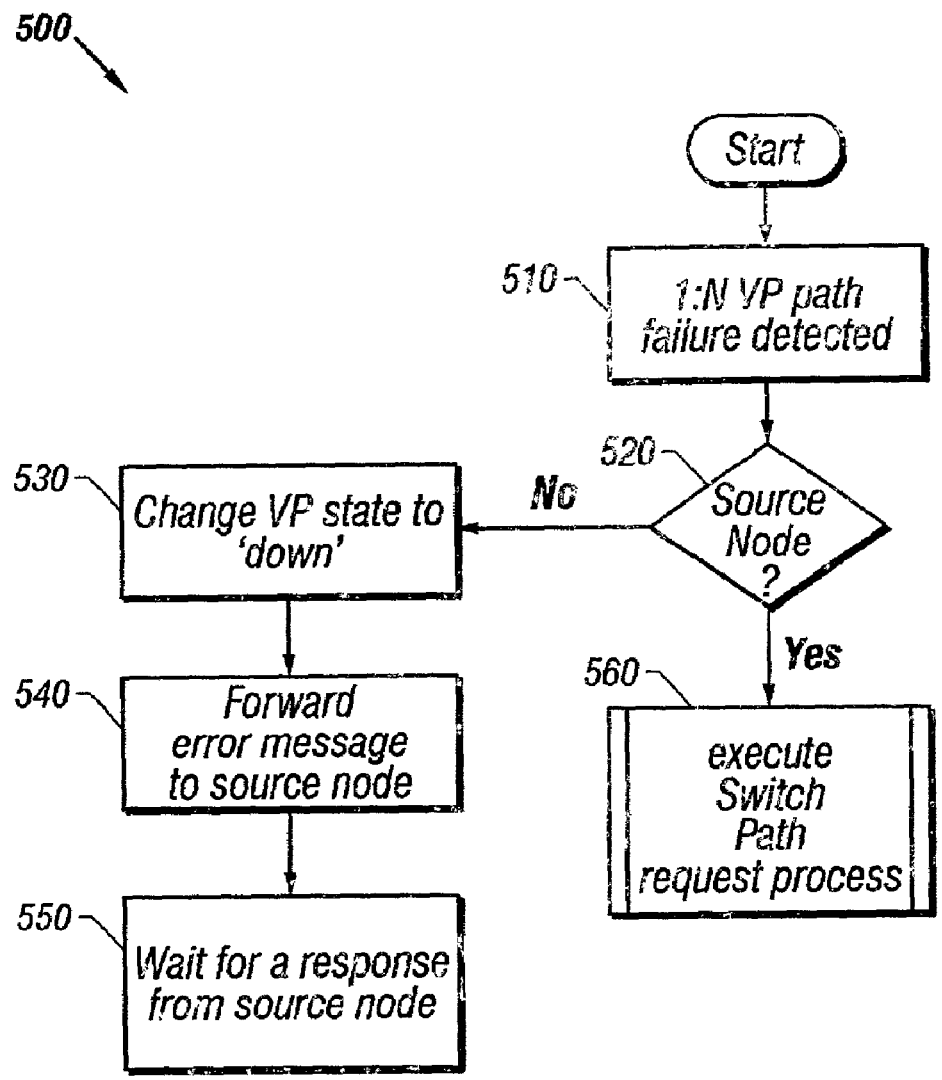
FIG. 5 is a flowchart illustrating the actions performed by a node during 1:N restoration.

FIG. 5 is a flowchart illustrating the actions performed by a node when the node receives a notification of a VP failure. Upon receipt of a notification of failure on the primary path (step 510), the node checks if the node is the source node of the VP (step 520). If the node is not the source node of the VP (i.e., the node is either a tandem node or the destination node of the VP) then the node changes the state of the VP to down (step 530). For 1:N restoration, the tandem and destination nodes do not release any resources assigned to the VP. The node forwards the failure notification to the source node of the VP (step 540). The node then waits for a response from the source node of the VP (step 550). If the failure notification is received by the source node of the failed VP, the source node executes a process to switch the VP to the secondary path (step 560).

Figure 6:
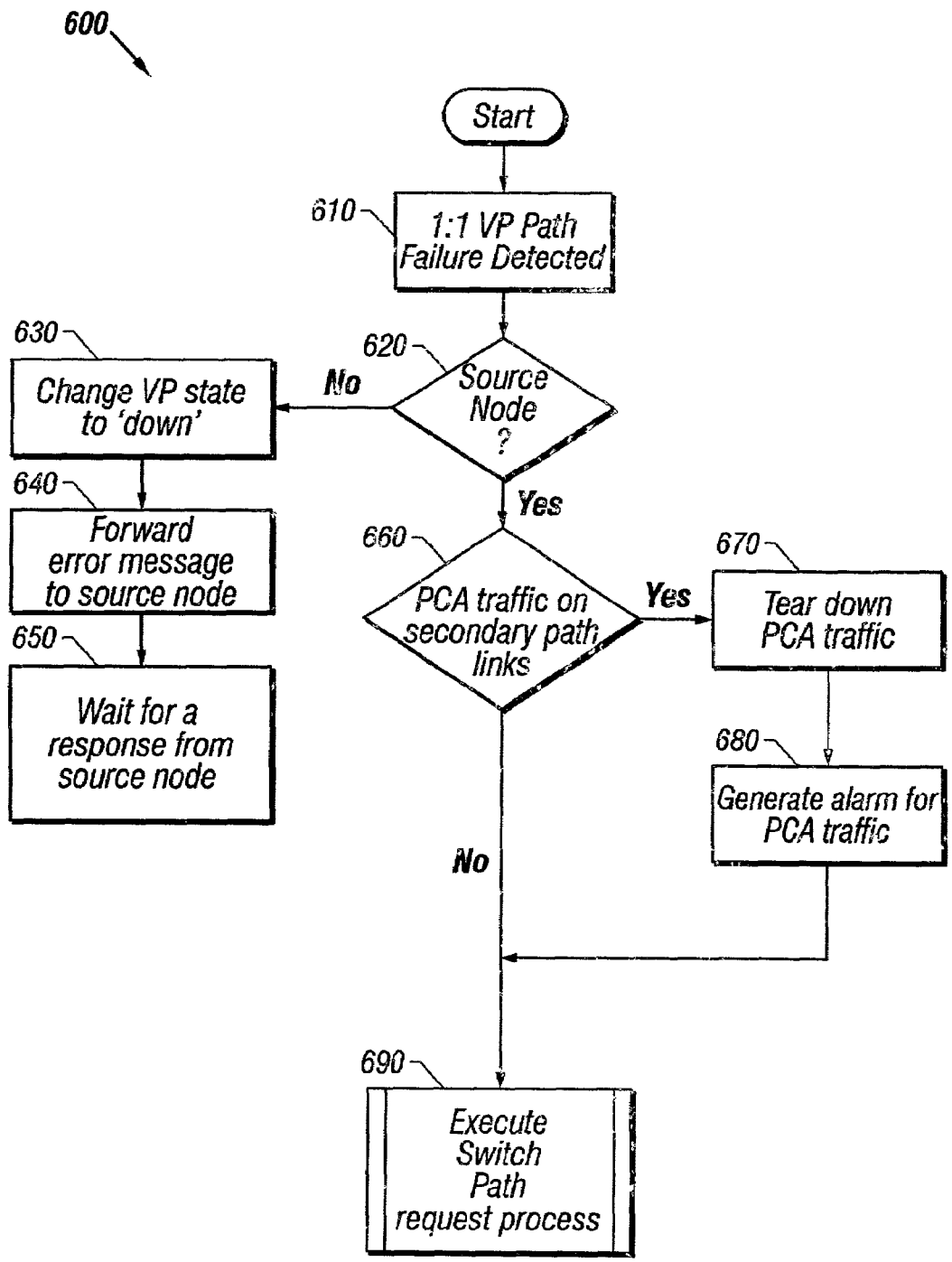
FIG. 6 is a flowchart illustrating the actions performed by a node when the node during 1:1.

FIG. 6 is a flowchart illustrating the actions performed by a node during 1:1 restoration. Upon receipt of a notification of failure on the primary path (step 610), the node checks if the node is the source node of the VP (step 620). If the node is not the source node of the VP (i.e., the node is either the tandem node or the destination node of the VP), then the node changes the state of the VP to down (step 630). For 1:1 restoration, the tandem and the destination nodes do not release any resources assigned to the VP. The node forwards the failure notification to the source node of the VP (step 640). The node then waits for a response from the source node of the VP (step 650). If the failure notification is receive by the source node of the failed VP, the source node checks the secondary path of the VP to determine if PCA traffic is using the secondary path links (step 660). If the PCA traffic is not using the secondary path links, the source node proceeds to initiate a Switch Path request process (step 690). If the PCA traffic is using the secondary path links, then the source node tears down the PCA connection on the secondary path links (step 670). The source node generates a network alarm for the PCA traffic (step 680). Once the PCA traffic has been removed from the secondary path links, the source node proceeds to initiate a Switch Path request process (step 690).

Switch Path Request Generation

Figure 7:
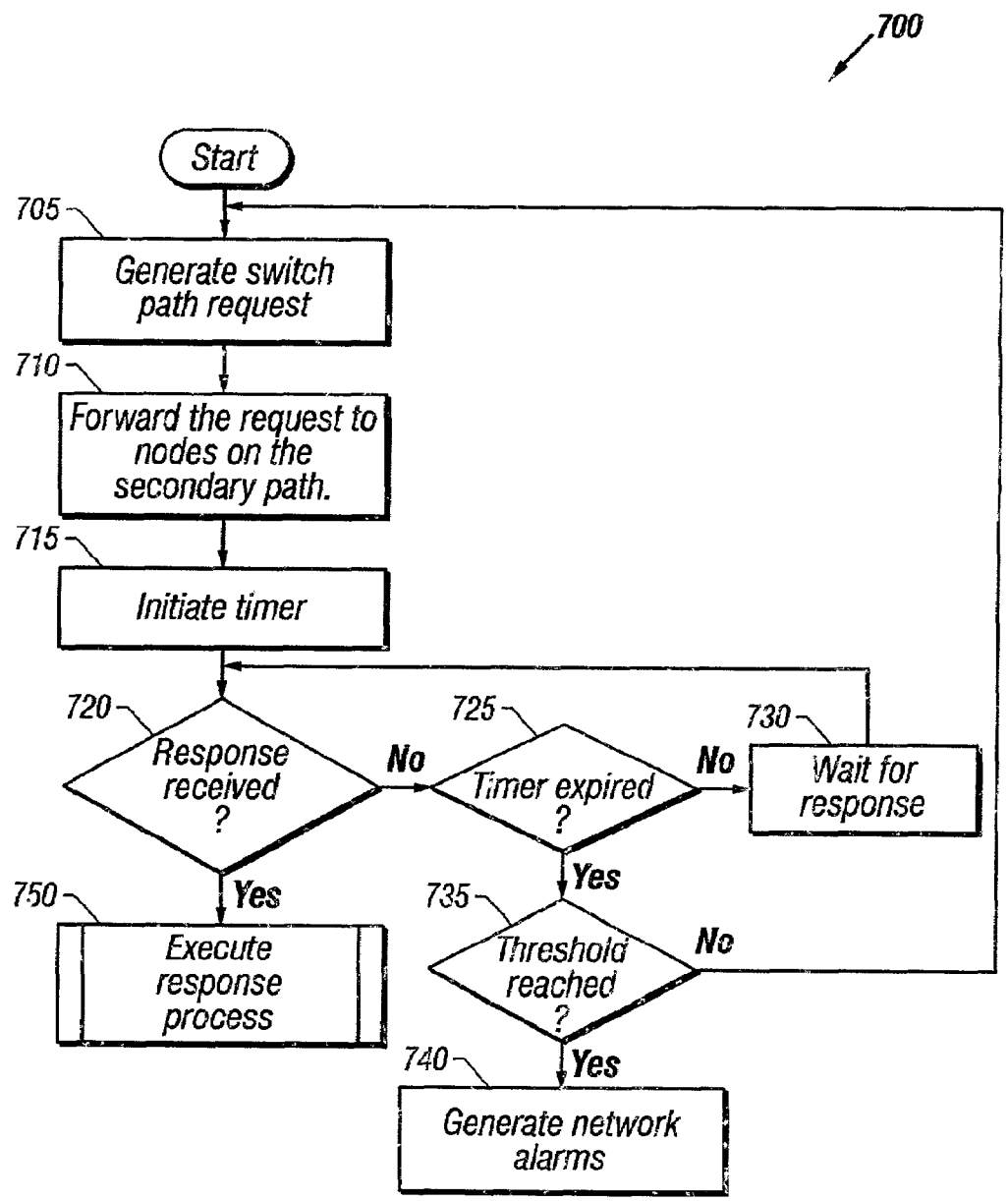
FIG. 7 is a flowchart illustrating the actions performed by the source node to initiate the switching of a virtual path.

FIG. 7 is a flowchart illustrating the actions performed by a source node to initiate the switching of the VP from the primary path to the secondary path. To initiate the switching of paths, the source node generates a Switch Path request (step 705). The source node forwards the Switch Path request to the nodes on the secondary path (step 710). After forwarding the request, the source node initiates a timer for receiving a response to the Switch Path request (step 715). The source node periodically checks whether the response to Switch Path request is received (step 720). If the response is not received, the source node checks if the timer to receive the response is expired (step 725). If the timer is not expired, the source node continues to wait for the response (step 730). If the timer expires before the source node receives a response, the source node determines if the number of Switch Path requests generated exceeds a predetermined threshold amount (step 735). If the threshold of the number of Switch Path requests is not reached, the source node generates another Switch Path request (step 705). If the threshold of the number of Switch Path requests is reached, the source node generates a network alarm (step 740). When the source node receives a response to Switch Path request, the source node executes a response process (step 750).

Processing of Switch Path Request at the Tandem Node

Figure 8:
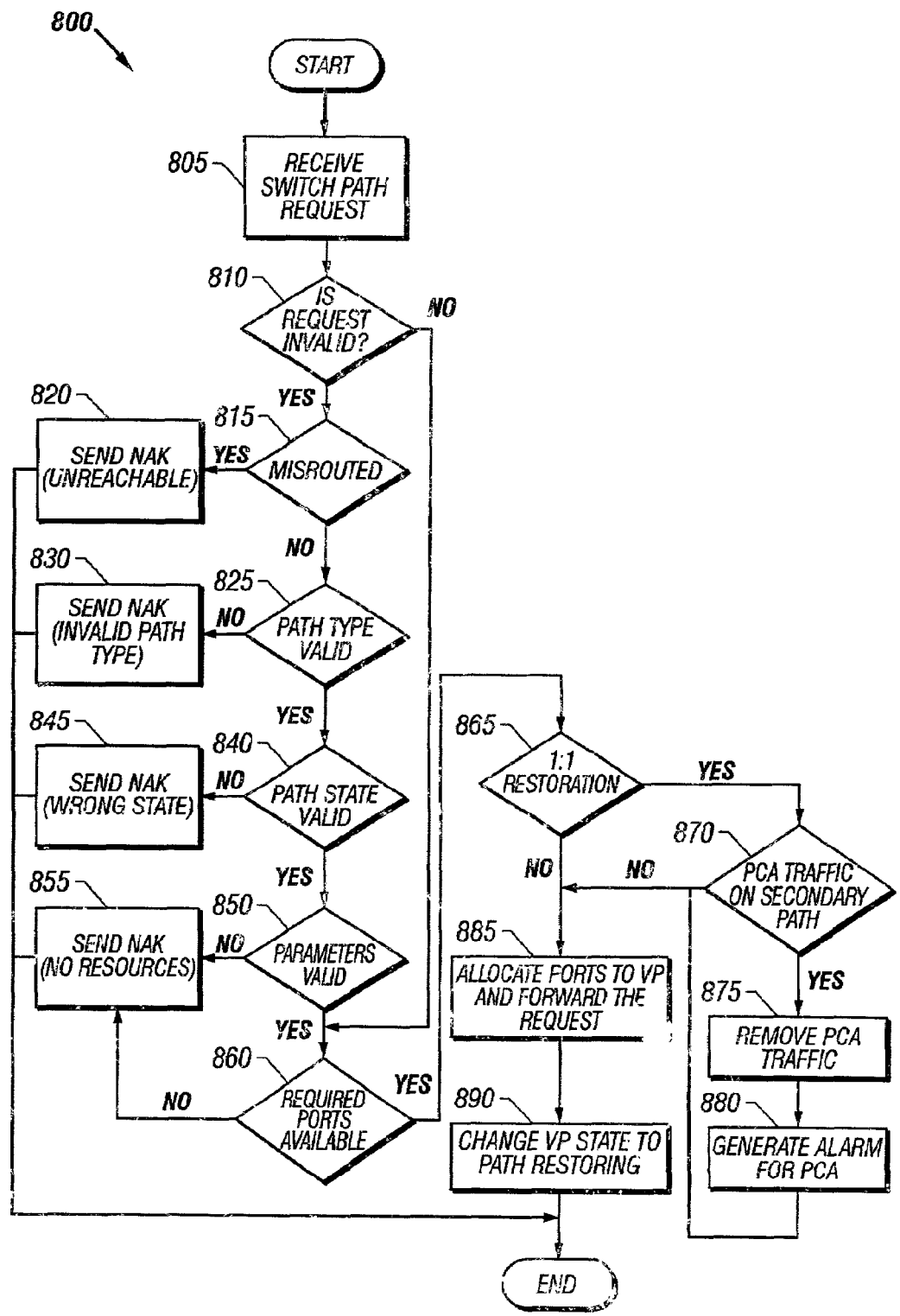
FIG. 8 is a flow chart illustrating the actions performed by a tandem node on the secondary path when the tandem node receives a Switch Path request packet.

FIG. 8 is a flow chart illustrating the actions performed by a tandem node on the secondary path when the tandem node receives a Switch Path request. Upon receipt of a Switch Path request (step 805), the tandem node analyzes the contents of the request and responds accordingly. The tandem node first determines if the request is invalid and contains any error (step 810). If the request is valid, the tandem node proceeds with resource checking (step 860). Otherwise, the process makes at least one of several determinations as to the reason for the request's invalidity. If the Switch Path request is misrouted (i.e., there is no path to the destination, or the tandem node does not recognize any of the Link IDs due to an incomplete network topology update) (step 815), the tandem node returns a NAK (UNREACHABLE) upstream (step 820). If the Path Type is invalid (step 825), then the tandem node responds with a NAK (INVALID PATH TYPE) (step 830). If the Switch Path Request is an unexpected request (i.e., the request arrives while the Path is in the Restoring or Deleting states) (step 840), the tandem node responds with a NAK (WRONG STATE) (step 845). If some of the parameters of the Switch Path request (such as the CoS, origin, target or bandwidth fields) are invalid (step 850), the tandem node returns a NAK (NO RESOURCES) (step 855). The tandem node then determines if sufficient active ports are available (step 860).

The link bandwidth for the secondary path is allocated at the time of the provisioning. However, the specific ports are allocated during the restoration. During the restoration, specific ports may not be available (e.g., due to hardware failure of port or port may be offline for maintenance purpose and the like). If the ports are not available, a NAK (NO RESOURCES) is returned (step 855). If sufficient ports are available to support allocated bandwidth, the tandem node determines the restoration method assigned to the failed VP (step 865). If the VP does not have 1:1 restoration method assigned (i.e., for example, 1:N restoration is assigned to the VP), the tandem node proceeds to port allocation (step 885). If the VP has 1:1 restoration method assigned, then the tandem node determines if there is any PCA traffic on the secondary path links (step 870). If there is PCA traffic on the secondary path links, the tandem node removes PCA traffic from the links (step 875). The tandem node generates a network alarm for the PCA traffic (step 880). After removing the PCA traffic, the tandem node proceeds with port allocation. The tandem node allocates appropriate ports on input and output links, increment the hops field 480 of the Switch Path request packet and forward the request out on the next appropriate link (step 885). The tandem node changes the state of the VP to restoring, initiates a timer and waits for a response to the forwarded request (step 890).

Processing of Switch Path Request at the Destination Node

Figure 9:
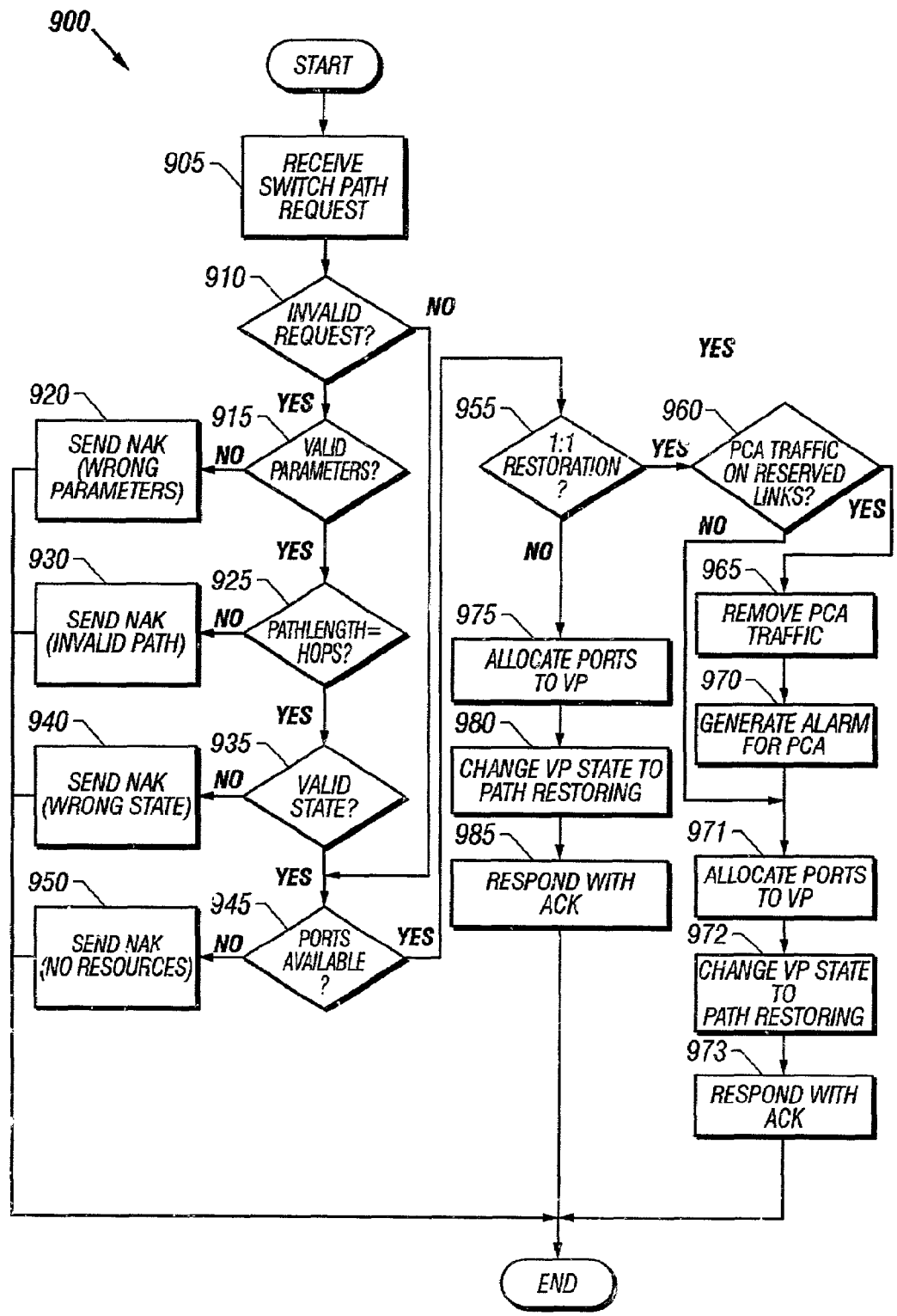
FIG. 9 is a flow chart illustrating the actions performed by the destination node when the destination node receives a Switch Path request packet.

FIG. 9 is a flow chart illustrating the actions performed by a destination node when the destination node receives a Switch Path request. Upon receipt of a Switch Path request (step 905), the destination node first determines if the request is invalid and contains errors (step 910). If the request is valid, the destination node proceeds with port allocation (step 945). If the request contains errors, then the destination node determines if any of the parameter fields are wrong (step 915). These parameters include bandwidth, type, CoS, and Link IDs and the like. If errors are found, a NAK (WRONG PARAMETERS) is returned upstream (step 920). If the Switch Path request contains a path length that does not match the hops field of the Switch Path request (step 925), the destination node sends a NAK (INVALID PATH) (step 930). If an unexpected Switch Path request is received by the destination node (i.e., the request arrives while the Path is in Restoring or Deleting states) (step 935), a NAK (WRONG STATE) is returned (step 940).

If no errors are found in the Switch Path Request, the destination node determines if sufficient ports are available to support the allocated bandwidth for the VP (step 945). If enough ports are not available, the destination node responds with a NAK (NO RESOURCES) (step 950). If sufficient ports are available to support allocated bandwidth, the destination node determines if 1:1 restoration method is assigned to the VP (step 955). If the VP does not have 1:1 restoration method assigned, the destination node proceeds with port allocation. The destination node allocates the ports and makes appropriate connections in a cross connect matrix for the path (step 975). The destination node changes the state of the VP to 'restoring' (step 980). The destination node then formats a Switch Path response packet with assigned port list and sends the response upstream (step 985).

If the VP has 1:1 restoration method assigned, then the destination node checks if there is any PCA traffic on the secondary path links (step 960). If there is PCA traffic on the secondary path links, the destination node removes the PCA traffic from (step 965). The destination node generates a network alarm for the PCA traffic (step 970). After removing the PCA traffic, the destination node proceeds to port allocation. The destination node allocates the ports and makes appropriate connections in a cross connect matrix for the path (step 971). The destination node changes the state of the VP to 'restoring' (step 972). The destination node then formats a Switch Path response packet with assigned port list and sends the response upstream (step 973).

Switch Path Request Response

Figure 10:
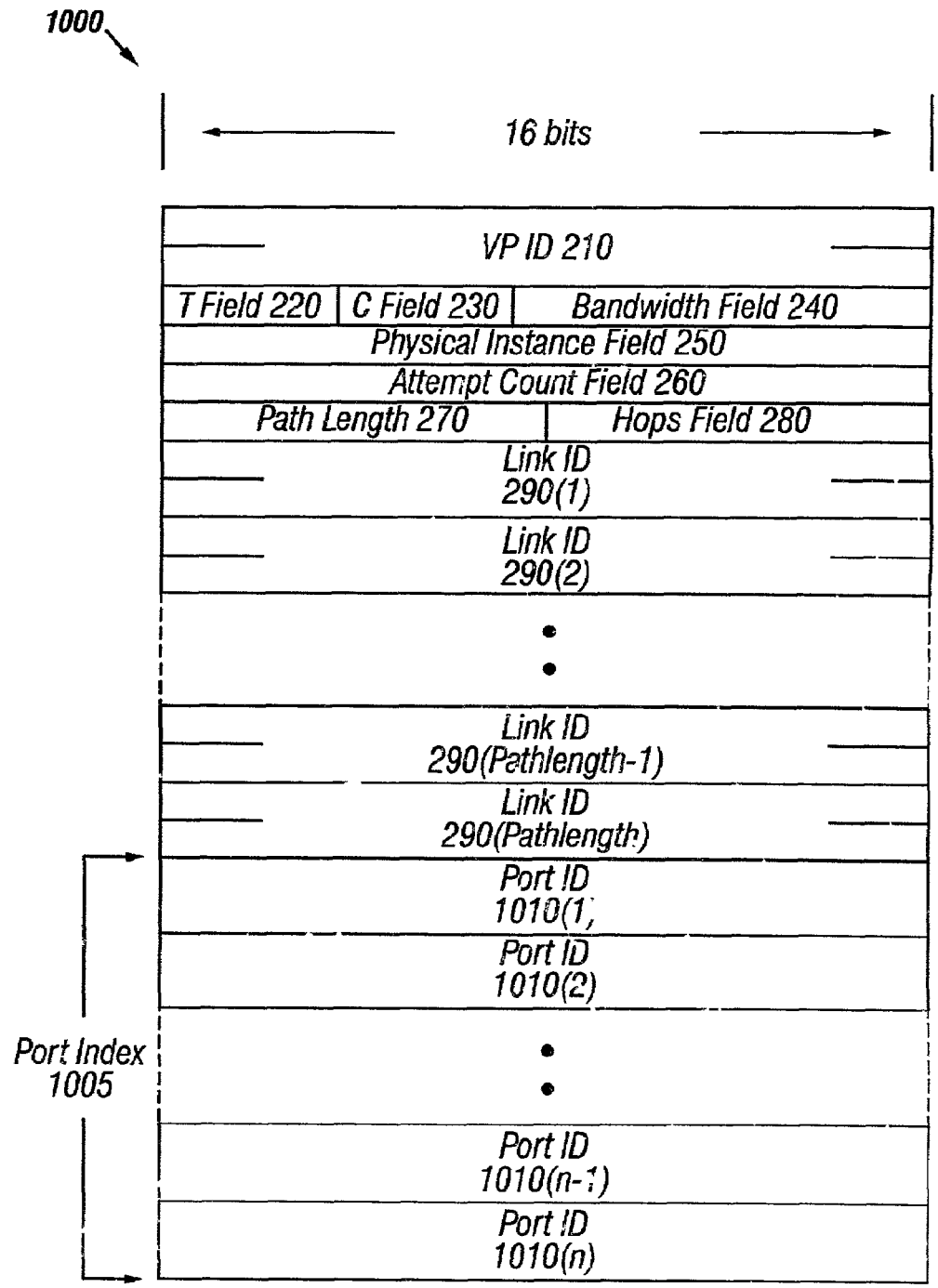
FIG. 10 illustrates an example of a Switch Path response packet.

FIG. 10 illustrates an example of a Switch Path response packet 1000. The command-specific contents of Switch Path response packet 1000 are similar to those of Switch Path request packet 400. In Switch Path response packet 1000, a list of Port IDs 1010 is added. Every node that receives Switch Path response packet 1000 adds a list of Port IDs to the packet. These ports are assigned on the upstream link. The Port IDs are local port IDs for the node which will be the next node to receive the Switch Path Response packet 1000. The number of ports assigned for the VP is same as the number of bandwidth units requested during the provisioning of the secondary path (e.g., in terms of STS-48 granularity).

For positive responses, the responding node copies the contents of the request and then appends a port index 1005 (e.g., Port IDs 1010(1)-(n)) and hops field 480 is decremented. For negative responses, the contents of the request are copied and, instead of a list of assigned Port IDs, a reason code for rejection is appended in place of port index 1005 and hops field 480 is decremented.

Processing of Switch Path Response Packet at the Tandem Node

Figure 11:
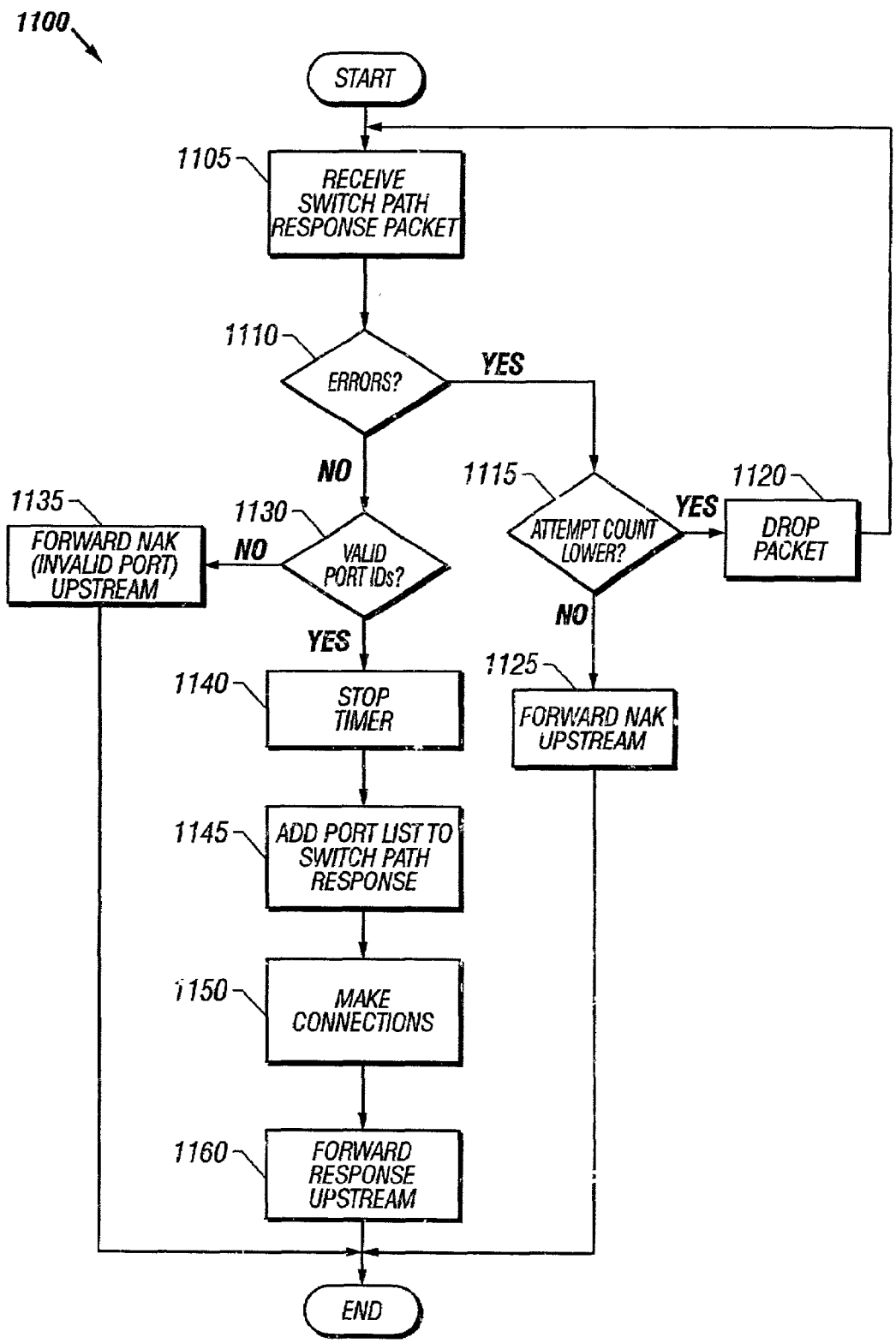
FIG. 11 is a flow chart illustrating the actions performed by a tandem node when the tandem node receives a Switch Path response packet.

FIG. 11 is a flow chart illustrating the actions performed by a tandem node when the tandem node receives a Switch Path response packet. When the tandem node receives the Switch Path response packet 1000 (step 1105), the tandem node determines if the packet contains any errors (step 1110). If the Switch Path response packet contains an error, the tandem node first determines if the attempt count field 460 of the Switch Path response packet 1000 is lower than the attempt count field of the last Switch Path request packet sent by the tandem node (step 1115). If the attempt count field 460 of the Switch Path response packet 1000 is lower than the attempt count field of the last Switch Path request packet forwarded downstream by the tandem node, the tandem node drops the Switch Path response packet and takes no action (step 1120). The tandem node drops the packet because the tandem node may later receive a Switch Path response packet with no errors (i.e., a positive response) to a later-transmitted Switch Path request packet. If the attempt count field 460 of the Switch Path response packet 1000 is higher than the attempt count field of the last Switch Path request packet forwarded downstream by the tandem node, the tandem forwards a negative response upstream (step 1125).

If no errors are indicated in the packet (i.e., the response is a positive response or an ACK), then the tandem node determines if the port index 1005 contains an invalid Port ID (step 1130). If the port index 1005 contains an invalid Port ID, then the tandem node forwards a negative response, NAK (INVALID PORT), upstream (step 1135). If the Port IDs in the port index 1005 are valid, the tandem node terminates any timer the tandem node had to monitor the response time (step 1140). The tandem node adds the list of allocated ports to the Switch Path response packet (step 1145). The tandem node then makes appropriate connections in the cross-connect matrix for the allocated ports (step 1150). After making the connections, the tandem node will forward the Switch Path response packet 1000 upstream to next node in the VP (step 1160).

Processing of Switch Path Response Packet at the Source Node

Figure 12:
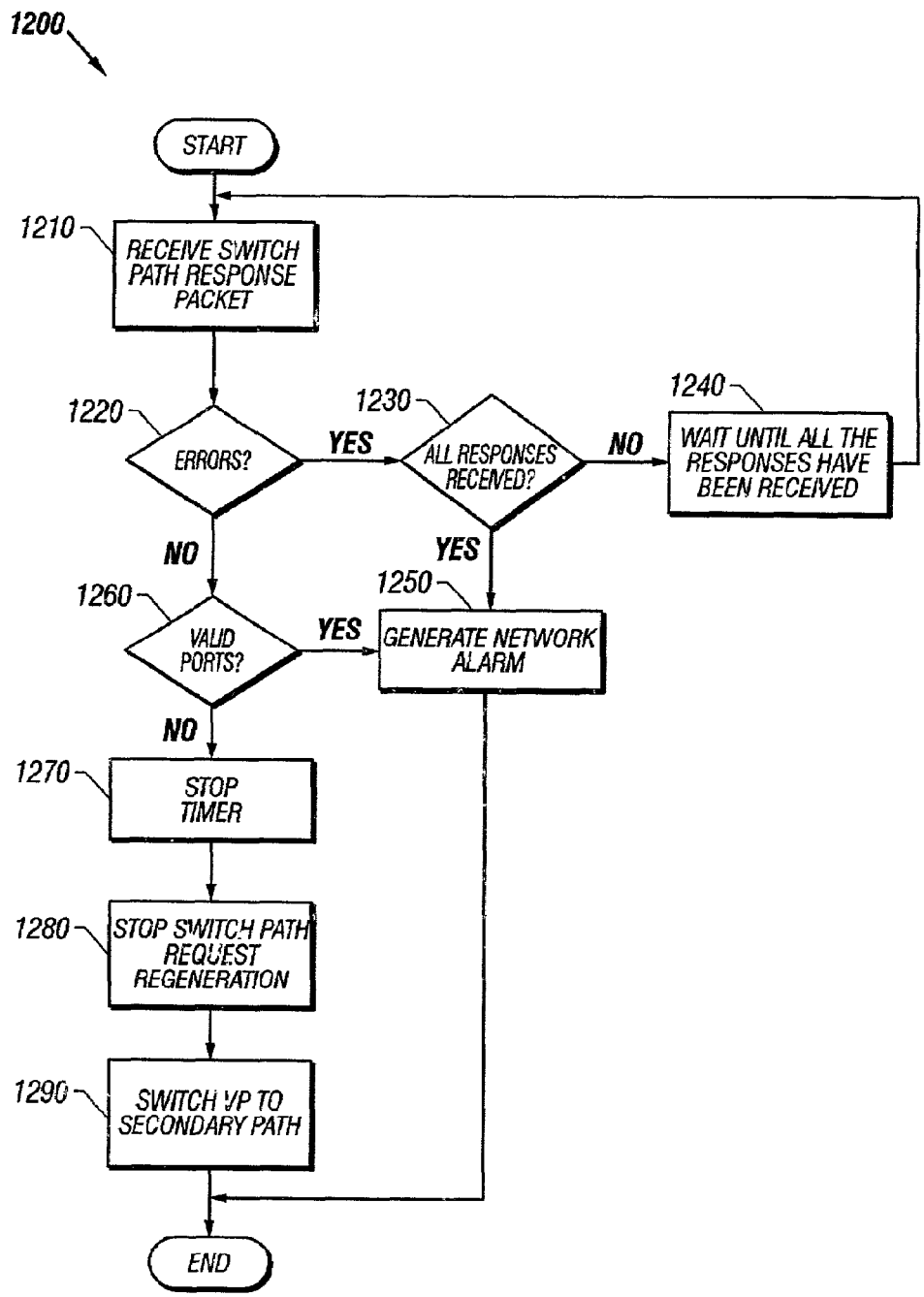
FIG. 12 is a flow chart illustrating the actions performed by the source node when the source node receives a Switch Path response packet.

FIG. 12 is a flow chart illustrating the actions performed by a source node when the source node receives a Switch Path response packet. When the source node receives the Switch Path response packet 1000 (step 1210), the source node determines if the packet contains any errors (step 1220). If the Switch Path response packet contains an error, the source node first determines if responses from all previously generated Switch Path requests have been received (step 1230). If the responses from all previously generated Switch Path requests have not been received, the source node takes no action and waits until the source node receives all the responses from previously generated Switch Path requests (step 1240). If the responses from all previously generated Switch Path requests have been received, the source node generates a network alarm (step 1250).

If no errors are indicated in the packet (i.e., the response is a positive response or an ACK), then the source node determines if the port index 1005 contains an invalid Port ID (step 1260). If the port index 1005 contains an invalid Port ID, the source node generates a network alarm (step 1250). If the Port IDs in the port index 1005 are valid, then the source node terminates any timer maintained by the source node to monitor the response time (step 1270). The source node then stops generating new Switch Path requests (step 1280). The source node switches the VP from the failed primary path to the allocated ports on the secondary path (step 1290). The source node ignores any further response from previously generated Switch Path requests.

Once the VP is switched to the secondary path, the VP continues to use the secondary path. If the secondary path fails and the failure on the primary path is fixed, the network switches the VP to the primary path following similar switch path process. In 1:1 restoration method, while the VP is using the secondary path, the network allows PCA traffic to use the primary path. In case of 1:N restoration method, if the sharing of links becomes unreliable, the network switches the VP to primary path, provided the failure on the primary path is fixed.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising: restoring a virtual path in an optical network, wherein said restoring comprises identifying a plurality of nodes with resources, wherein said nodes with resources are ones of said nodes having a resource necessary to support said virtual path;

provisioning a first physical path for said virtual path, said first physical path comprising ones of said nodes with resources;

reserving a resource for a second physical path for said virtual path at ones of said nodes having said resource necessary to support said virtual path, wherein said first physical path and said second physical path are between a first and a second node of said optical network, and one of said first physical path and said second physical path carries protection channel access traffic; detecting a failure in said virtual path, wherein said detection of said failure is done by receiving a failure message; if said first node receives said failure message, identifying one of said first physical path and said second physical path with no failure; provisioning said second physical path using said reserved resource, in response to said identifying; if said protection channel access traffic is using said one of said first physical path and said second physical path with no failure, disconnecting said protection channel access traffic, and generating an alarm for said protection channel access traffic; and if said protection channel access traffic is not using said one of said first physical path and said second physical path with no failure, changing a state of said virtual path to restoring, (i) forwarding a switch path request packet to nodes on said one of said first physical path and said second physical path with no failure, and (ii) waiting for a switch path response packet for a predetermined time interval.

2. The method of claim 1, wherein said restoring is done by identifying one of said first physical path and said second physical path experiencing a failure, and switching said virtual path to one of said first physical path and said second physical path not experiencing a failure.

3. The method of claim 2, wherein said first physical path and said second physical oath between said first and said second node comprise a plurality of intermediate nodes, and said first physical path and said second physical path are link and intermediate node disjoint.

4. The method of claim 3, wherein said optical network comprises said nodes, each one of said nodes is coupled to at least one another of said nodes by a plurality of optical links, and said virtual path is provisioned on one of said first physical path and said second physical path.

5. The method of claim 4, wherein each one of said nodes is coupled to at least one another of said nodes in a mesh topology.

6. The method of claim 5, wherein said restoring of said virtual path is completed in less than 2 seconds.

7. The method of claim 5, wherein said restoring of said virtual path is completed in less than 250 milliseconds.

8. The method of claim 5, wherein said restoring of said virtual path is completed in less than 50 milliseconds.

9. The method of claim 5, wherein said second physical path is shared by a plurality of other virtual paths.

10. The method of claim 9, wherein one of said first physical path and said second physical path which is not used by one of said virtual path and said plurality of other virtual paths is used by said protection channel access traffic.

11. The method of claim 10, further comprising: if one of said plurality of intermediate nodes and said second node receives said failure message, changing a state of said virtual path to down, and forwarding said failure message to said first node.

12. The method of claim 5, further comprising:

if said switch path response packet is not received within said predetermined time interval, repeating steps (i)-(ii) for a predefined threshold times.

13. The method of claim 12, further comprising:

if said switch path response packet is not received within said predefined threshold times, generating a network alarm;

if said switch path response packet is received within said predefined threshold times with no errors, switching said virtual path on a list of allocated ports contained in said switch path response packet; and if said switch path response packet is received within said predefined threshold times with at least one error, waiting until responses to all said switch path request packets are received.

14. The method of claim 12, further comprising:

if responses to all said switch path request packets are received with at least one error, generating a network alarm.

15. The method of claim 12, wherein said predetermined time interval and predefined threshold are defined during provisioning of said virtual path.

16. The method of claim 12, wherein said predetermined time interval and predefined threshold are dynamically calculated by said network based on network traffic condition.

17. The method of claim 12, wherein one of said plurality of intermediate nodes receives said switch path request packet.

18. The method of claim 17, further comprising:

if a resource is not available for said virtual path, copying said switch path request packet to a switch path response packet, decrementing a hop count field in said switch path response packet, adding an error code to said switch path response packet, and responding with said switch path response packet.

19. The method of claim 17, further comprising:
if said switch path request packet is received with at least one error,
  copying said switch path request packet to a switch path response packet,
  decrementing a hop count field in said switch path response packet,
  adding an error code to said switch path response packet, and
  responding with said switch path response packet; and
if said switch path request packet is received with no error,
  determining whether said protection channel access traffic is using a requested resource for said virtual path.

20. The method of claim 19, further comprising:
if said protection channel access traffic is using said requested resource for said virtual path,
  disconnecting said protection channel access traffic, and
  generating an alarm for said protection channel access traffic;
if said protection channel access traffic is not using said requested resource for said virtual path,
  allocating said resource to said virtual path,
  incrementing a hop count field in said switch path request packet,
  changing a state of said virtual path to restoring,
  forwarding said switch path request packet to an adjacent node comprising said virtual path, and
  waiting for a switch path response packet from said adjacent node.

21. The method of claim 20, further comprising:
if said switch path response packet is not received within a predetermined time interval,
  forwarding a negative acknowledgment to said first node.

22. The method of claim 20, further comprising:
if said switch path response packet is received with no errors,
  updating said virtual path information in a node database,
  assigning a plurality of ports to said virtual path,
  decrementing a hop count field in said switch path response packet, and
  forwarding said switch path response packet to said first node; and
if said switch path response packet is received with at least one error,
  comparing an attempt count field of said switch path response packet with an attempt count field of a switch path request packet previously forwarded by said intermediate node.

23. The method of claim 22, further comprising:
if said attempt count field of said switch path response packet is lower than said attempt count field of said switch path request packet previously forwarded by said intermediate node,
  ignoring said switch path response packet; and
if said attempt count field of said switch path response packet is not lower than said attempt count field of said switch path request packet previously forwarded by said intermediate node,
  decrementing a hop count field in said switch path response packet, and
  forwarding said switch path response packet to said first node.

24. The method of claim 12, wherein said second node receives said switch path request packet.

25. The method of claim 24, further comprising:
if a resource is not available for said virtual path,
  copying said switch path request packet to a switch path response packet,
  decrementing a hop count field in said switch path response packet,
  adding an error code to said switch path response packet, and
  responding with said switch path response packet.

26. The method of claim 24, further comprising:
if said switch path request packet is received with at least one error,
  copying said switch path request packet to a switch path response packet,
  decrementing a hop count field in said switch path response packet,
  adding an error code to said switch path response packet, and
  responding with said switch path response packet; and
if said switch path request packet is received with no error,
  determining whether said protection channel access traffic is using a requested resource for said virtual path.

27. The method of claim 26, further comprising:
if said protection channel access traffic is using said requested resource for said virtual path,
  disconnecting said protection channel access traffic,
  generating an alarm for said protection channel access traffic; and
if said protection channel access traffic is not using said requested resource for said virtual path,
  copying said switch path request packet to a switch path response packet,
  updating said virtual path information in a node database,
  assigning a plurality of ports to said virtual path,
  decrementing a hop count field in said switch path request packet,
  changing a state of said virtual path to restoring, and
  responding with said switch path response packet.

28. A network element configured to restore a virtual path in an optical network, the network element comprising:
a processor, said processor configured to
  identify a plurality of nodes with resources, wherein said nodes with resources are ones of said nodes having a resource necessary to support said virtual path,
  provision a first physical path for said virtual path, said first physical path comprising ones of said nodes with resources,
  reserve a resource for a second physical path for said virtual path at ones of said nodes having said resource necessary to support said virtual path, and
  restore said virtual path by provisioning said second physical path using said reserved resource, wherein said first physical path and said second physical path are between a first and a second node of said optical network, and one of said first physical path and said second physical path carries protection channel access traffic,
receive a failure message to detect a failure in said virtual path. identify one of said first physical path and said second physical path with no failure, in response to receiving said failure message,
if said protection channel access traffic is using said one of said first physical path and said second physical path with no failure, disconnect said protection channel access traffic, and generate an alarm for said protection channel access traffic; and if said protection channel access traffic is not using said one of said first physical path and said second physical path with no failure, change a state of said virtual path to restoring, and
  (i) forward a switch path request packet to nodes on said one of said first physical path and said second physical path with no failure, and
  (ii) wait for a switch path response packet for a predetermined time interval.

29. The network element of claim 28, wherein said processor is further configured to
  identify one of said first physical path and said second physical path experiencing a failure, and
  switch said virtual path to one of said first physical path and said second physical path not experiencing a failure.

30. The network element of claim 28, wherein said first physical path and said second physical path between said first and said second node comprise a plurality of intermediate nodes, and said first physical path and said second physical path are link and intermediate node disjoint.

31. The network element of claim 30, wherein
  said optical network comprises said nodes,
  each one of said nodes is coupled to at least one another of said nodes by a plurality of optical links, and
  said virtual path is provisioned on one of said first physical path and said second physical path.

32. The network element of claim 31, wherein each one of said nodes is coupled to at least one another of said nodes in a mesh topology.

33. The network element of claim 32, wherein said processor is further configured to restore said virtual path in less than 2 seconds.

34. The network element of claim 32, wherein said processor is further configured to restore said virtual path in less than 250 milliseconds.

35. The network element of claim 32, wherein said processor is further configured to restore said virtual path in less than 50 milliseconds.

36. The network element of claim 32, wherein said second physical path is shared by a plurality of other virtual paths.

37. The network element of claim 36, wherein one of said first physical path and said second physical path which is not used by one of said virtual path and said plurality of other virtual paths is used by said protection channel access traffic.

38. The network element of claim 37, wherein said processor is configured as one of said plurality of intermediate nodes and said second node, and if said processor receives said failure message, the processor is further configured to
  change a state of said virtual path to down, and
  forward said failure message to said first node.

39. The network element of claim 32, wherein said processor is further configured to:
  if said switch path response packet is not received within said predetermined time interval,
    repeat steps (i)-(ii) for a predefined threshold times.

40. The network element of claim 39, wherein said processor is further configured to
  if said switch path response packet is not received within said predefined threshold times,
    generate a network alarm;
  if said switch path response packet is received within said predefined threshold times with no errors,
    switch said virtual path on a list of allocated ports contained in said switch path response packet; and
  if said switch path response packet is received within said predefined threshold times with at least one error,
    wait until responses to all said switch path request packets are received.

41. The network element of claim 39, wherein said processor is further configured to
  if responses to all said switch path request packets are received with at least one error,
    generate a network alarm.

42. The network element of claim 39, wherein said predetermined time interval and predefined threshold are defined during provisioning of said virtual path.

43. The network element of claim 39, wherein said predetermined time interval and predefined threshold are dynamically calculated by said network based on network traffic condition.

44. The network element of claim 39, wherein
  said processor is configured as one of said plurality of intermediate nodes, and
  said processor receives said switch path request packet.

45. The network element of claim 44, wherein said processor is further configured to
  if a resource is not available for said virtual path,
    copy said switch path request packet to a switch path response packet,
    decrement a hop count field in said switch path response packet,
    add an error code to said switch path response packet, and
    respond with said switch path response packet.

46. The network element of claim 44, wherein said processor is further configured to
  if said switch path request packet is received with at least one error,
    copy said switch path request packet to a switch path response packet,
    decrement a hop count field in said switch path response packet,
    add an error code to said switch path response packet, and
    respond with said switch path response packet; and
  if said switch path request packet is received with no error,
    determine whether said protection channel access traffic is using a requested resource for said virtual path.

47. The network element of claim 46, wherein said processor is further configured to
  if said protection channel access traffic is using said requested resource for said virtual path,
    disconnect said protection channel access traffic, and
    generate an alarm for said protection channel access traffic;
  if said protection channel access traffic is not using said requested resource for said virtual path,
    allocate said resource to said virtual path,
    increment a hop count field in said switch path request packet,
    change a state of said virtual path to restoring,
    forward said switch path request packet to an adjacent node comprising said virtual path, and
    wait for a switch path response packet from said adjacent node.

48. The network element of claim 47, wherein said processor is further configured to
  if said switch path response packet is not received within a predetermined time interval,
    forward a negative acknowledgment to said first node.

49. The network element of claim 47, wherein said processor is further configured to if said switch path response packet is received with no errors,
    update said virtual path information in a node database,
    assign a plurality of ports to said virtual path,
    decrement a hop count field in said switch path response packet, and
    forward said switch path response packet to said first node; and
if said switch path response packet is received with at least one error,
    compare an attempt count field of said switch path response packet with an attempt count field of a switch path request packet previously forwarded by said intermediate node.

50. The network element of claim 49, wherein said processor is further configured to
if said attempt count field of said switch path response packet is lower than said attempt count field of said switch path request packet previously forwarded by said intermediate node,
    ignore said switch path response packet; and
if said attempt count field of said switch path response packet is not lower than said attempt count field of said switch path request packet previously forwarded by said intermediate node,
    decrement a hop count field in said switch path response packet, and
    forward said switch path response packet to said first node.

51. The network element of claim 39, wherein
said processor is configured as said second node, and
said processor receives said switch path request packet.

52. The network element of claim 51, wherein said processor is further configured to
if a resource is not available for said virtual path,
    copy said switch path request packet to a switch path response packet,
    decrement a hop count field in said switch path response packet,
    add an error code to said switch path response packet, and
    respond with said switch path response packet.

53. The network element of claim 51, wherein said processor is further configured to
if said switch path request packet is received with at least one error,
    copy said switch path request packet to a switch path response packet,
    decrement a hop count field in said switch path response packet,
    add an error code to said switch path response packet, and
    respond with said switch path response packet; and
if said switch path request packet is received with no error,
    determine whether said protection channel access traffic is using a requested resource for said virtual path.

54. The network element of claim 53, wherein said processor is further configured to
if said protection channel access traffic is using said requested resource for said virtual path,
    disconnect said protection channel access traffic,
    generate an alarm for said protection channel access traffic; and
if said protection channel access traffic is not using said requested resource for said virtual path,
    copy said switch path request packet to a switch path response packet,
    update said virtual path information in a node database,
    assign a plurality of ports to said virtual path,
    decrement a hop count field in said switch path request packet,
    change a state of said virtual path to restoring, and
    respond with said switch path response packet.

55. A computer system for restoring a virtual path in an optical network, said computer system comprising:
means for identifying a plurality of nodes with resources, wherein said nodes with resources are ones of said nodes having a resource necessary to support said virtual path;
means for provisioning a first physical path for said virtual path, said first physical path comprising ones of said nodes with resources;
means for reserving a resource for a second physical path for said virtual path at ones of said nodes having said resource necessary to support said virtual path; and
means for restoring said virtual path by provisioning said second physical path using said reserved resource, wherein said first physical path and said second physical path are between a first and a second node of said optical network, and one of said first physical path and said second physical path carries protection channel access traffic,
means for detecting a failure in said virtual path comprising means for receiving a failure message,
means for identifying one of said first physical path and said second physical path with no failure, in response to receiving said failure message,
means for disconnecting said protection channel access traffic if said protection channel access traffic is using said one of said first physical path and said second physical path with no failure,
means for generating an alarm for said protection channel access traffic if said protection channel access traffic is using said one of said first physical path and said second physical path with no failure, and
means for changing a state of said virtual path to restoring if said protection channel access traffic is not using said one of said first physical path and said second physical path with no failure,
    (i) means for forwarding a switch path request packet to nodes on said one of said first physical path and said second physical path with no failure;
    (ii) means for waiting for a switch path response packet for a predetermined time interval.

56. The computer system of claim 55, further comprising:
means for identifying one of said first physical path and said second physical path experiencing a failure, and
means for switching said virtual path to one of said first physical path and said second physical path not experiencing a failure.

57. The computer system of claim 55, wherein
said first physical path and said second physical path between said first and said second node comprise a plurality of intermediate nodes, and
said first physical path and said second physical path are link and intermediate node disjoint.

58. The computer system of claim 57, wherein
said optical network comprises said nodes,
each one of said nodes is coupled to at least one another of said nodes by a plurality of optical links, and
said virtual path is provisioned on one of said first physical path and said second physical path.

59. The computer system of claim 58, wherein each one of said nodes is coupled to at least one another of said nodes in a mesh topology.

60. The computer system of claim 59, wherein said restoring of said virtual path is completed in less than 2 seconds.

61. The computer system of claim 59, wherein said restoring of said virtual path is completed in less than 250 milliseconds.

62. The computer system of claim 59, wherein said restoring of said virtual path is completed in less than 50 milliseconds.

63. The computer system of claim 59, wherein said second physical path is shared by a plurality of other virtual paths.

64. The computer system of claim 63, wherein one of said first physical path and said second physical path which is not used by one of said virtual path and said plurality of other virtual paths is used by said protection channel access traffic.

65. The computer system of claim 64, further comprising:
means for changing a state of said virtual path to down if one of said plurality of intermediate nodes and said second node receives said failure message; and
means for forwarding said failure message to said first node if one of said plurality of intermediate nodes and said second node receives said failure message.

66. The computer system of claim 59, further comprising:
means for repeating steps (i)-(ii) for a predefined threshold times if said switch path response packet is not received within said predetermined time interval.

67. The computer system of claim 66, further comprising:
means for generating a network alarm if said switch path response packet is not received within said predefined threshold times;
means for switching said virtual path on a list of allocated ports contained in said switch path response packet if said switch path response packet is received within said predefined threshold times with no errors; and
means for waiting until responses to all said switch path request packets are received if said switch path response packet is received within said predefined threshold times with at least one error.

68. The computer system of claim 66, further comprising:
means for generating a network alarm if responses to all said switch path request packets are received with at least one error.

69. The computer system of claim 66, wherein said predetermined time interval and predefined threshold are defined during provisioning of said virtual path.

70. The computer system of claim 66, wherein said predetermined time interval and predefined threshold are dynamically calculated by said network based on network traffic condition.

71. The computer system of claim 66, wherein one of said plurality of intermediate nodes receives said switch path request packet.

72. The computer system of claim 71, further comprising:
means for copying said switch path request packet to a switch path response packet if a resource is not available for said virtual path;
means for decrementing a hop count field in said switch path response packet if a resource is not available for said virtual path;
means for adding an error code to said switch path response packet if a resource is not available for said virtual path; and
means for responding with said switch path response packet if a resource is not available for said virtual path.

73. The computer system of claim 71, further comprising:
means for copying said switch path request packet to a switch path response packet if said switch path request packet is received with at least one error;
means for decrementing a hop count field in said switch path response packet if said switch path request packet is received with at least one error;
means for adding an error code to said switch path response packet if said switch path request packet is received with at least one error;
means for responding with said switch path response packet if said switch path request packet is received with at least one error;
means for determining whether said protection channel access traffic is using a requested resource for said virtual path if said switch path request packet is received with no error.

74. The computer system of claim 73, further comprising:
means for disconnecting said protection channel access traffic if said protection channel access traffic is using said requested resource for said virtual path;
means for generating an alarm for said protection channel access traffic if said protection channel access traffic is using said requested resource for said virtual path;
means for allocating said resource to said virtual path if said protection channel access traffic is not using said requested resource for said virtual path;
means for incrementing a hop count field in said switch path request packet if said protection channel access traffic is not using said requested resource for said virtual path;
means for changing a state of said virtual path to restoring if said protection channel access traffic is not using said requested resource for said virtual path;
means for forwarding said switch path request packet to an adjacent node comprising said virtual path if said protection channel access traffic is not using said requested resource for said virtual path; and
means for waiting for a switch path response packet from said adjacent node if said protection channel access traffic is not using said requested resource for said virtual path.

75. The computer system of claim 74, further comprising:
means for forwarding a negative acknowledgment to said first node if said switch path response packet is not received within a predetermined time interval.

76. The computer system of claim 74, further comprising:
means for updating said virtual path information in a node database if said switch path response packet is received with no errors;
means for assigning a plurality of ports to said virtual path if said switch path response packet is received with no errors;
means for decrementing a hop count field in said switch path response packet if said switch path response packet is received with no errors;
means for forwarding said switch path response packet to said first node if said switch path response packet is received with no errors; and
means for comparing an attempt count field of said switch path response packet with an attempt count field of a switch path request packet previously forwarded by said intermediate node if said switch path response packet is received with at least one error.

77. The computer system of claim 76, further comprising:
means for ignoring said switch path response packet if said attempt count field of said switch path response packet is lower than said attempt count field of said switch path request packet previously forwarded by said intermediate node;

means for decrementing a hop count field in said switch path response packet if said attempt count field of said switch path response packet is not lower than said attempt count field of said switch path request packet previously forwarded by said intermediate node; and means for forwarding said switch path response packet to said first node if said attempt count field of said switch path response packet is not lower than said attempt count field of said switch path request packet previously forwarded by said intermediate node.

78. The computer system of claim 66, wherein said second node receives said switch path request packet.

79. The computer system of claim 78, further comprising:

means for copying said switch path request packet to a switch path response packet if a resource is not available for said virtual path;

means for decrementing a hop count field in said switch path response packet if a resource is not available for said virtual path;

means for adding an error code to said switch path response packet if a resource is not available for said virtual path; and means for responding with said switch path response packet if a resource is not available for said virtual path.

80. The computer system of claim 78, further comprising:

means for copying said switch path request packet to a switch path response packet if said switch path request packet is received with at least one error;

means for decrementing a hop count field in said switch path response packet if said switch path request packet is received with at least one error;

means for adding an error code to said switch path response packet if said switch path request packet is received with at least one error; and means for responding with said switch path response packet if said switch path request packet is received with at least one error; and means for determining whether said protection channel access traffic is using a requested resource for said virtual path if said switch path request packet is received with no error.

81. The computer system of claim 80, further comprising:

means for disconnecting said protection channel access traffic if said protection channel access traffic is using said requested resource for said virtual path;

means for generating an alarm for said protection channel access traffic if said protection channel access traffic is using said requested resource for said virtual path;

means for copying said switch path request packet to a switch path response packet if said protection channel access traffic is not using said requested resource for said virtual path;

means for updating said virtual path information in a node database if said protection channel access traffic is not using said requested resource for said virtual path;

means for assigning a plurality of ports to said virtual path if said protection channel access traffic is not using said requested resource for said virtual path;

means for decrementing a hop count field in said switch path request packet if said protection channel access traffic is not using said requested resource for said virtual path;

means for changing a state of said virtual path to restoring if said protection channel access traffic is not using said requested resource for said virtual path; and means for responding with said switch path response packet if said protection channel access traffic is not using said requested resource for said virtual path.

82. A computer program product for restoring a virtual path in an optical network, encoded in computer readable storage media, said program product comprising a set of instructions executable on a computer system, said set of instructions configured to identify a plurality of nodes with resources, wherein said nodes with resources are ones of said nodes having a resource necessary to support said virtual path;

provision a first physical path for said virtual path, said first physical path comprising ones of said nodes with resources;

reserve a resource for a second physical path for said virtual path at ones of said nodes having said resource necessary to support said virtual path;

restore said virtual path by provisioning said second physical path using said reserved resource, wherein said first physical path and said second physical path are between a first and a second node of said optical network, and one of said first physical path and said second physical path carries protection channel access traffic;

receive a failure message to detect a failure in said virtual path;

identify one of said first physical path and said second physical path with no failure, in response to receiving said failure message;

if said protection channel access traffic is using said one of said first physical path and said second physical path with no failure, disconnect said protection channel access traffic, and generate an alarm for said protection channel access traffic; and if said protection channel access traffic is not using said one of said first physical path and said second physical path with no failure, change a state of said virtual path to restoring, and
  (i) forward a switch path request packet to nodes on said one of said first physical path and said second physical path with no failure, and
  (ii) wait for a switch path response packet for a predetermined time interval.

83. The computer program product of claim 82, wherein said set of instructions is further configured to identify one of said first physical path and said second physical path experiencing a failure, and switch said virtual path to one of said first physical path and said second physical path not experiencing a failure.

84. The computer program product of claim 82, wherein said first physical path and said second physical path between said first and said second node comprise a plurality of intermediate nodes, and said first physical path and said second physical path are link and intermediate node disjoint.

85. The computer program product of claim 84, wherein said optical network comprises said nodes, each one of said nodes is coupled to at least one another of said nodes by a plurality of optical links, and said virtual path is provisioned on one of said first physical path and said second physical path.

86. The computer program product of claim 85, wherein each one of said nodes is coupled to at least one another of said nodes in a mesh topology.

87. The computer program product of claim 86, wherein said restoring of said virtual path is completed in less than 2 seconds.

88. The computer program product of claim 86, wherein said restoring of said virtual path is completed in less than 250 milliseconds.

89. The computer program product of claim 86, wherein said restoring of said virtual path is completed in less than 50 milliseconds.

90. The computer program product of claim 86, wherein said second physical path is shared by a plurality of other virtual paths.

91. The computer program product of claim 90, wherein one of said first physical path and said second physical path which is not used by one of said virtual path and said plurality of other virtual paths is used by said protection channel access traffic.

92. The computer program product of claim 91, wherein said set of instructions is further configured to
    if one of said plurality of intermediate nodes and said second node receives said failure message,
        change a state of said virtual path to down, and
        forward said failure message to said first node.

93. The computer program product of claim 86, wherein said set of instructions is further configured to
    if said switch path response packet is not received within said predetermined time interval,
        repeat steps (i)-(ii) for a predefined threshold times.

94. The computer program product of claim 93, wherein said set of instructions is further configured to
    if said switch path response packet is not received within said predefined threshold times,
        generate a network alarm;
    if said switch path response packet is received within said predefined threshold times with no errors,
        switch said virtual path on a list of allocated ports contained in said switch path response packet; and
    if said switch path response packet is received within said predefined threshold times with at least one error,
        wait until responses to all said switch path request packets are received.

95. The computer program product of claim 93, wherein said set of instructions is further configured to
    if responses to all said switch path request packets are received with at least one error,
        generate a network alarm.

96. The computer program product of claim 93, wherein said predetermined time interval and predefined threshold are defined during provisioning of said virtual path.

97. The computer program product of claim 93, wherein said predetermined time interval and predefined threshold are dynamically calculated by said network based on network traffic condition.

98. The computer program product of claim 93, wherein one of said plurality of intermediate nodes receives said switch path request packet.

99. The computer program product of claim 98, wherein said set of instructions is further configured to
    if a resource is not available for said virtual path,
        copy said switch path request packet to a switch path response packet,
        decrement a hop count field in said switch path response packet,
        add an error code to said switch path response packet, and
        respond with said switch path response packet.

100. The computer program product of claim 98, wherein said set of instructions is further configured to
    if said switch path request packet is received with at least one error,
        copy said switch path request packet to a switch path response packet,
        decrement a hop count field in said switch path response packet,
        add an error code to said switch path response packet, and
        respond with said switch path response packet; and
    if said switch path request packet is received with no error,
        determine whether said protection channel access traffic is using a requested resource for said virtual path.

101. The computer program product of claim 100, wherein said set of instructions is further configured to
    if said protection channel access traffic is using said requested resource for said virtual path,
        disconnect said protection channel access traffic, and
        generate an alarm for said protection channel access traffic;
    if said protection channel access traffic is not using said requested resource for said virtual path,
        allocate said resource to said virtual path,
        increment a hop count field in said switch path request packet,
        change a state of said virtual path to restoring,
        forward said switch path request packet to an adjacent node comprising said virtual path, and
        wait for a switch path response packet from said adjacent node.

102. The computer program product of claim 101, wherein said set of instructions is further configured to
    if said switch path response packet is not received within a predetermined time interval,
        forward a negative acknowledgment to said first node.

103. The computer program product of claim 101, wherein said set of instructions is further configured to
    if said switch path response packet is received with no errors,
        update said virtual path information in a node database,
        assign a plurality of ports to said virtual path,
        decrement a hop count field in said switch path response packet, and
        forward said switch path response packet to said first node; and
    if said switch path response packet is received with at least one error,
        compare an attempt count field of said switch path response packet with an attempt count field of a switch path request packet previously forwarded by said intermediate node.

104. The computer program product of claim 103, wherein said set of instructions is further configured to
    if said attempt count field of said switch path response packet is lower than said attempt count field of said switch path request packet previously forwarded by said intermediate node,
        ignore said switch path response packet; and
    if said attempt count field of said switch path response packet is not lower than said attempt count field of said switch path request packet previously forwarded by said intermediate node,
        decrement a hop count field in said switch path response packet, and
        forward said switch path response packet to said first node.

105. The computer program product of claim 93, wherein said second node receives said switch path request packet.

106. The computer program product of claim 105, wherein said set of instructions is further configured to if a resource is not available for said virtual path,
  copy said switch path request packet to a switch path response packet,
  decrement a hop count field in said switch path response packet,
  add an error code to said switch path response packet, and
  respond with said switch path response packet.

107. The computer program product of claim 105, wherein said set of instructions is further configured to
  if said switch path request packet is received with at least one error,
    copy said switch path request packet to a switch path response packet,
    decrement a hop count field in said switch path response packet,
    add an error code to said switch path response packet, and
    respond with said switch path response packet; and
  if said switch path request packet is received with no error,
    determine whether said protection channel access traffic is using a requested resource for said virtual path.

108. The computer program product of claim 107, wherein said set of instructions is further configured to
  if said protection channel access traffic is using said requested resource for said virtual path,
    disconnect said protection channel access traffic,
    generate an alarm for said protection channel access traffic; and
  if said protection channel access traffic is not using said requested resource for said virtual path,
    copy said switch path request packet to a switch path response packet,
    update said virtual path information in a node database,
    assign a plurality of ports to said virtual path,
    decrement a hop count field in said switch path request packet,
    change a state of said virtual path to restoring, and
    respond with said switch path response packet.

* * * * *